US006991316B2

(12) United States Patent
Maru et al.

(10) Patent No.: US 6,991,316 B2
(45) Date of Patent: Jan. 31, 2006

(54) PRINTING METHOD, PRINT UNIT, PROGRAM FOR THE SAME, AND STORAGE MEDIUM FOR THE SAME

(75) Inventors: Akiko Maru, Kanagawa (JP); Hiroshi Tajika, Kanagawa (JP); Yuji Konno, Kanagawa (JP); Daisaku Ide, Tokyo (JP); Takeshi Yazawa, Kanagawa (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/649,660

(22) Filed: Aug. 28, 2003

(65) Prior Publication Data

US 2004/0041868 A1 Mar. 4, 2004

(30) Foreign Application Priority Data

Aug. 30, 2002 (JP) .................................. 2002-255904

(51) Int. Cl.
*B41J 2/145* (2006.01)
*B41J 2/15* (2006.01)

(52) U.S. Cl. ........................................ 347/41
(58) Field of Classification Search ............... 347/9–15, 347/40–43, 57–59
See application file for complete search history.

(56) References Cited

U.S. PATENT DOCUMENTS

| 4,920,355 A | 4/1990 | Katerberg ............... 347/41 |
| 6,203,133 B1 | 3/2001 | Tanaka et al. ............ 347/15 |
| 6,334,659 B1 | 1/2002 | Maeda et al. ............. 347/12 |
| 6,491,373 B1 * | 12/2002 | Fujita et al. ............. 347/41 |
| 2002/0080394 A1 | 6/2002 | Ogasahara et al. ........ 358/1.15 |

FOREIGN PATENT DOCUMENTS

| JP | 7-242025 | 9/1995 |
| JP | 9-46522 | 2/1997 |

* cited by examiner

*Primary Examiner*—Juanita D. Stephens
(74) *Attorney, Agent, or Firm*—Fitzpatrick, Cella, Harper & Scinto

(57) ABSTRACT

The invention prevents a pattern arising from periodicity of dot arrangements from appearing as noise, such as a streak, when a plurality of different dot arrangements are used repeatedly in a unit of a predetermined number of the dot arrangements for the same level of gradation of input image data, and thereby makes it possible to print a high-quality image. To this end, when input image data quantized to one of multivalued levels of gradation is allocated to a dot arrangement of M×N, a matrix of A×B created by combining a plurality of different dot arrangements each displaying the same level of gradation of the input image data in a raster direction and in a column direction is used as a minimum unit, and the dot arrangement of this matrix is allocated to the input image data.

8 Claims, 22 Drawing Sheets

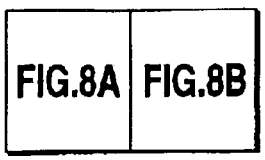
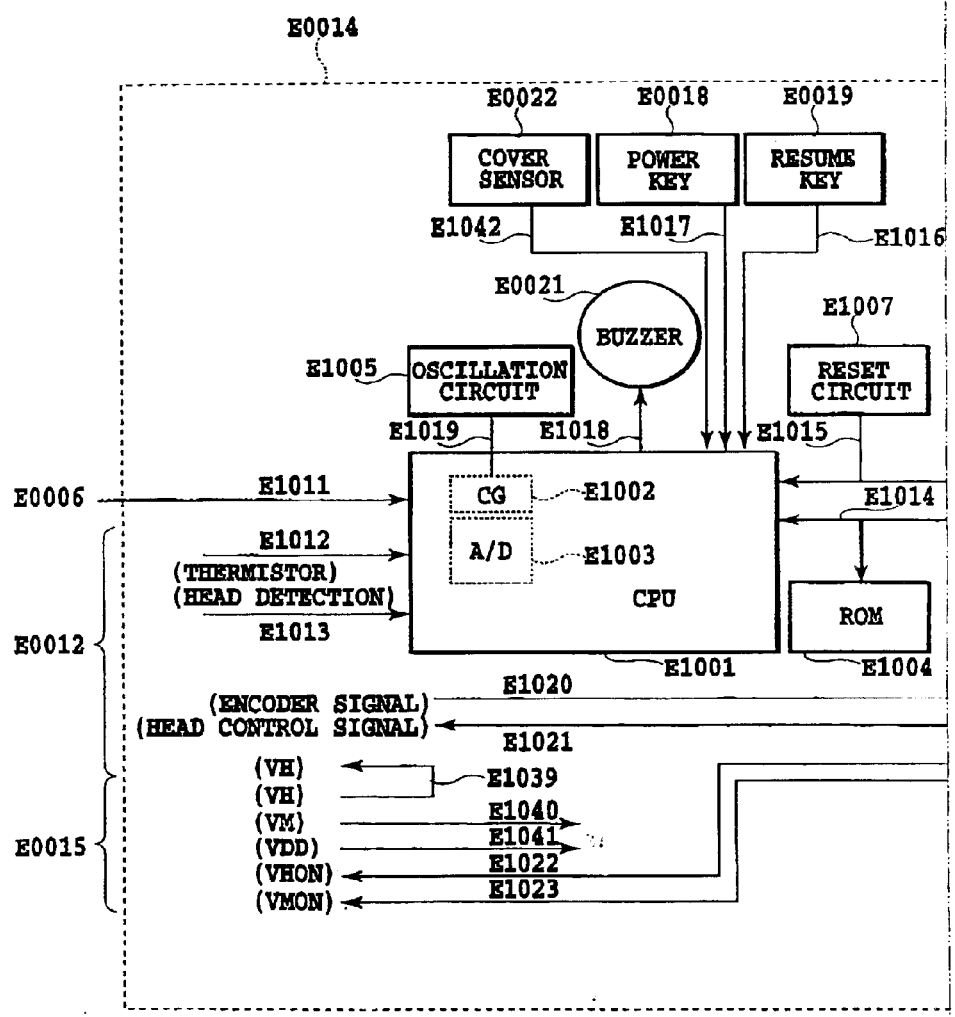
FIG.8A

FOUR INPUT PIXELS
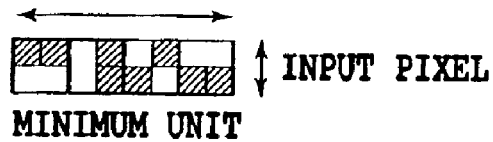 INPUT PIXEL
MINIMUM UNIT
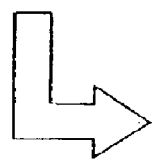
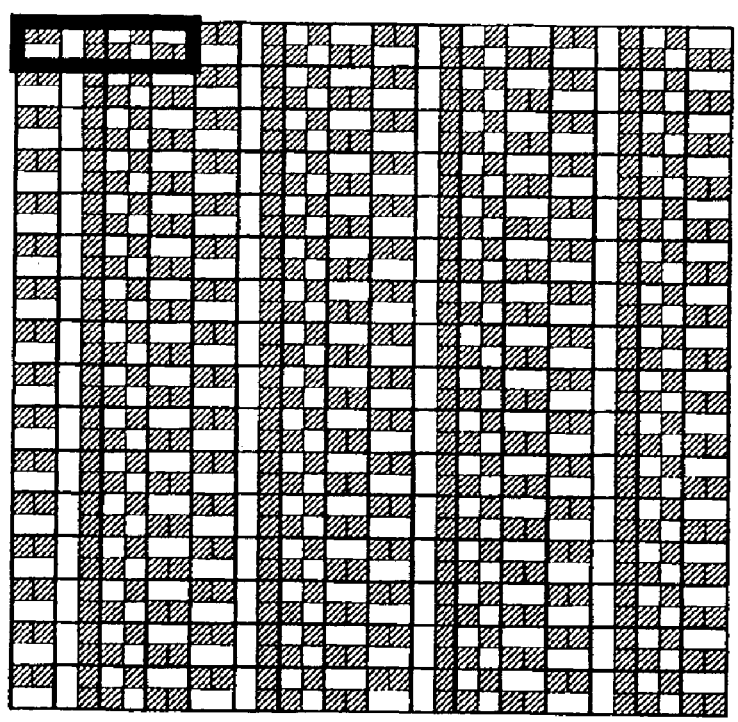
FIG.19
PRIOR ART

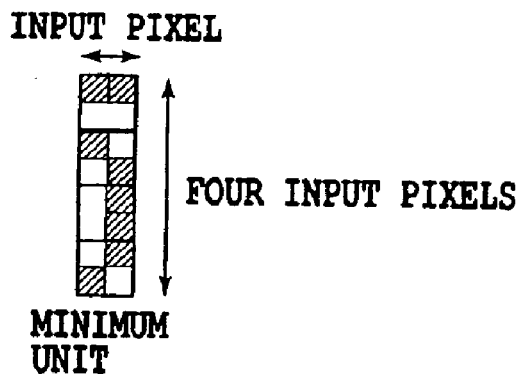
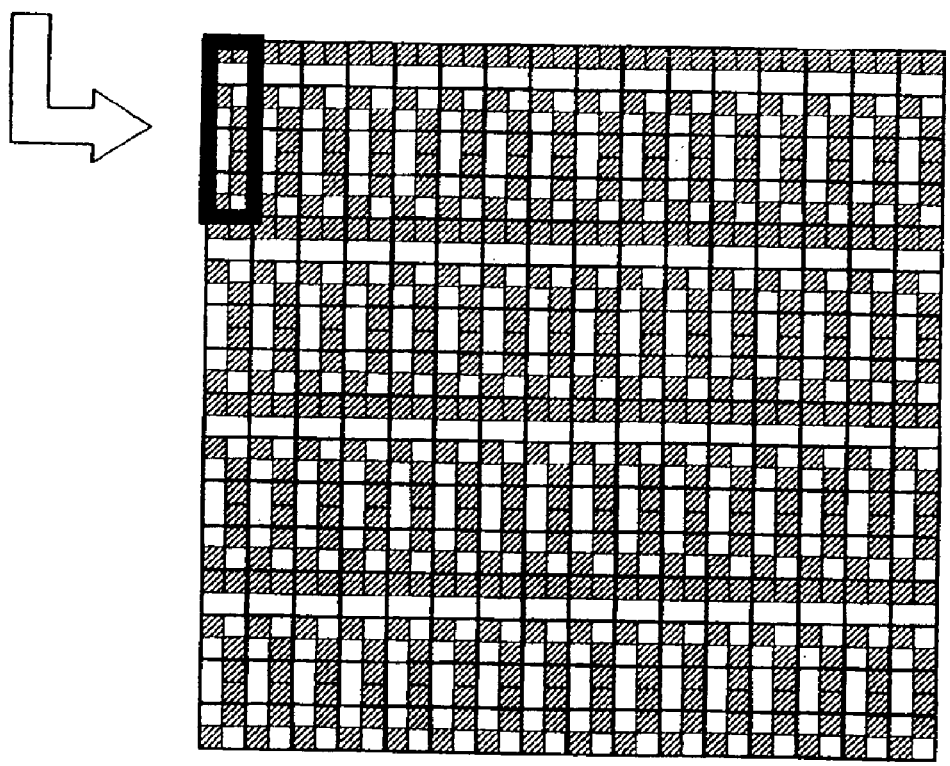
FIG.20
PRIOR ART

PRINTING METHOD, PRINT UNIT, PROGRAM FOR THE SAME, AND STORAGE MEDIUM FOR THE SAME

This application claims priority from Japanese Patent Application No. 2002-255904 filed Aug. 30, 2002, which is incorporated hereinto by reference.

BACKGROUND OF THE INVENTION

1. Field of the Invention

This invention relates to a printing method, a print apparatus, a program, and a storage medium, and more specifically, to those that are applied to position adjustment of ink dot formation in an inkjet printing system with a preferable result. In addition, this invention is applicable to a copier, a facsimile having a communication system, equipment having a printing portion, such as a word processor, and further an industrial printing system that is combined with any of various kinds of processing devices in a sophisticated manner as well as general print units.

2. Description of the Related Art

A so-called serial scan type image printing system that executes a printing operation with a printing head that is a major constituent of a printing portion being scanned on a printing medium finds applications in various image formation. Especially, those that use the inkjet system are becoming rapidly popular because those printers support high resolution and color printing and consequently image quality has made remarkable improvement in recent years. The equipment of this kind uses the so-called multi-nozzle head formed by accumulating and disposing ejection openings for ejecting ink, for example, as a drop. At present, it has become possible to form images having higher resolution with this multi-nozzle head by increasing integration density of the ejection openings and lessening the amount of ink discharge per dot. On the other hand, in order to realize the image quality comparable to that attained with that of the silver salt photograph, there are being developed a variety of technologies, such as one whereby, in addition to 4 colors of inks (inks of following colors: cyan, magenta, yellow, and black) that are basic colors, inks of light colors obtained by decreasing these concentrations are used simultaneously. In addition, regarding lowering of the printing speed that is anticipated with increasing quality of printing, the capability of resolving it has been realized by adopting such technologies as an increment in the number of printing elements, improvement of driving frequency, and even bi-directional printing, and hence good throughput is being attained increasingly.

FIG. 15 schematically shows a general construction of a printer for conducting printing using the above-mentioned multi-nozzle head. In this figure, reference numeral 1901 denotes a head cartridge provided in the printing system so as to support one of 4 colors of inks, for example, black (K), cyan (C), magenta (M), and yellow (Y). Each head cartridge 1901 is composed of an ink tank 1902T in which an ink of one of those colors is filled and a head portion 1902I formed by arranging a large number of ejection openings each capable of ejecting the ink supplied from the tank on the printing medium.

Reference numeral 1903 denotes a paper feed roller (feed roller) that rotates in a direction indicated by an arrow in the figure to convey a printing medium (printing paper) 1907 in a y-direction (sub scanning direction) at any time while sandwiching the printing medium 1907 in cooperation with an auxiliary roller 1904. Moreover, reference numeral 1905 denotes a pair of feed rollers for supplying the printing paper 1907 to a printing position while sandwiching it and also performing a function of holding the printing paper 1907 flatly between the rollers 1903 and 1904.

Reference numeral 1906 denotes a carriage that supports four head cartridges 1901 and moves these in a main scanning direction in the printing operation. This carriage 1906 is moved to a position (home position) h shown with the dashed line in the figure when printing is not being executed or when a recovery operation for keeping ink ejecting performance of the head portion 1902H excellent is conducted.

The carriage 1906 that has been moved to the home position h before start of printing starts to be moved in an x-direction upon receipt of a print start command. Then, the ink is ejected from a plurality (n units) of ejection openings provided on the head portion 1902H according to print data, whereby printing for a width corresponding to a range of an ejection opening arrangement is performed. Thus, when the printing operation is completed to an end of the printing paper 1907 in the x-direction, in the case of single-direction printing, the carriage 1906 returns the home position h and performs a printing operation again in the x-direction, whereas in the case of bi-directional printing, the printing operation is also performed when the carriage 1916 moves in the minus x-direction toward the home position h. In either case, before the next printing operation is started after the completion of one printing operation (1 scan) in one direction, the printing paper 1907 is fed by a predetermined amount (equal to the width of the ejection opening arrangement) by the paper feeding roller 1903 revolving in an arrow direction in the figure by a predetermined amount. In this way, the printing operation of one scan and the feeding of the printing paper by the predetermined width are repeated, and thereby the printing of data for one sheet of the printing paper is completed.

In such a serial-type inkjet printer, in order to support image printing with higher resolution, various contrivances have been adopted regarding the construction of the head portion and the printing method.

For example, due to a constraint in manufacture of the multi-nozzle head, there is inevitably a limit in the density of a nozzle array on a single line.

FIG. 16A shows an example of the head for realizing still higher-density printing to circumvent the problem. In this head, a large number of ejection openings are arranged on a line in a y-direction with a predetermined pitch py, and this ejection opening array is also provided on another line that is displaced by a predetermined distance px, making two ejection opening arrays in the x-direction, wherein the ejection opening array on the other line is shifted to those on the one line in the y-direction by py/2. By this arrangement, a resolution twice as high as the resolution of a single array of ejection openings is realized. Furthermore, when applying this contrivance to the apparatus in FIG. 15, it is possible to arrange the heads, each of which is for one color as shown in FIG. 16A, side by side in the x-direction to support 6 colors of inks. In this construction, only with proper adjustment of ejecting timing for both arrays of ejection openings, color printing with a resolution twice as high as the resolution attained with a single array of ejection openings can be achieved.

Incidentally, there is also a technology, as disclosed in U.S. Pat. No. 4,920,355 and Japanese Patent Application Laid-open No.7-242025 (1995), in which the amount of paper feeding for each scanning of printing is set to a predetermined number of pixels smaller than the width of the nozzle array while the construction of a multi-nozzle array is kept to a low resolution, so that high-resolution printing is achieved. Such print methods are called the interlace printing method hereinafter.

With reference to FIG. 17, this interlace printing method will be described briefly. Here, printing is assumed such that a head H in which the ejection openings are arranged by a pitch of 300 dpi (dot per inch) is used to complete an image of 1200 dpi. For simplicity, the number of ejection openings is set to nine, and the amount of paper feeding to be done at each scanning of printing is set equal to nine pixels for 1200 dpi. Rasters printed in the forward travel are represented with solid lines, the rasters printed in the reverse travel are represented with dashed lines, and the figure shows these rasters being formed alternately.

Here, an example where a paper is fed by a constant amount, i.e., nine pixels for each feeding, is described, but the interlace printing is not restricted to this construction. It can be said that any construction in which an image having a pitch finer than the original pitch of the arrangement of the ejection openings is completed by a plurality of printing scanning lines belongs to the interlace printing method even if the amount of paper feeding is not always constant. In any case, the interlace printing method enables image printing with higher resolution than the original resolution corresponding to the array of ejection openings.

By various methods described in the foregoing, printing of images with resolution higher than that of the nozzle array is made possible.

On the other hand, the printing resolution of the printing system is not necessarily equal to the input resolution from a host device serving as an image data supply source, and printing systems of recent years are capable of printing according to plural input resolutions. For example, when an output of high-definition monochromatic characters and patterns is desired, it is preferable to print binary images with the same input resolution as the highest resolution of the printing system. When high-speed processing is desired or when it is desired for a load on host equipment to be lessened, if a printer with a printing resolution of 2400 dpi is enabled to receive input of image data with a quarter of its resolution, namely 600 dpi, it is possible to shorten a transfer time of data from the host device. At this time, since one output pixel represents a binary value, one input pixel having a multivalued level can be printed in a gradation representation of 17 values by output pixels of 4×4. Such an approach has already been proposed and put into practical use.

As one example, a technology disclosed in Japanese Patent Application Laid-open No 9-046522 (1997) will be described. If the input resolution is 300 dpi and the output resolution of a printer is 600 dpi, the printer can represent 5-valued gradation by a dot arrangement of 2×2. Denoting 5-valued levels as "level 0" though "level 4", each one level of gradation can be represented by a plurality of dot patterns (patterns of dot arrangement) except "level 0" and "level 4," as shown in FIG. 18. Japanese Patent Application Laid-open No. 9-046522 (1997) discloses a method whereby the plurality of patterns are arranged sequentially or at random. With this arrangement of the plurality of patterns, a dot arrangement constituting a pixel at each level of gradation is not fixed; therefore this method has an effect of reducing the so-called "sweep-together phenomenon" that may appear at pseudo outlines and edges of an image when the pseudo half tone processing is performed, etc. Moreover, this method has also an effect of averaging use states of nozzles in the printing head.

Moreover, in the case where such a head as shown in FIG. 16A is used, since even-number rasters and odd-number rasters that are to be arranged alternately in the y-direction (sub scanning direction) are printed by different ejection opening arrays, impact positions of dots formed by one ejection opening array are displaced slightly from those formed by other array and hence there may occur deterioration in the image quality. One of the causes of this is a phenomenon that a plane of the head (face plane) on which the ejection openings are provided is deformed by swelling of the ink, temperature increase, etc. For example, if a convex deformation has occurred therein between the ejection opening array taking part in printing of the odd-number rasters (odd-number nozzle array) and the ejection opening array taking part in even-number rasters (even-number nozzle array), the ink is ejected from each ejection opening array in a different direction, i.e., in the shape of a character "Λ." Displacement of ink impact position between rasters arising from such a phenomenon causes detrimental effects on the image quality, although the amount is very little, and the deterioration becomes significant in high-resolution images obtained by a binarization method, such as the error diffusion method.

That technology has been put into practice wherein, in the case where a plurality of dot patterns are used sequentially for one level of gradation, four kinds of dot patterns are arranged in the main scanning direction with a fixed order as a minimum unit and the unit is used repeatedly for every four input pixels of an image.

Such a printing method is effective, especially, in high-resolution printing systems. For example, in a printer that is intended to realize photographic image quality, input resolution equal to or better than visual resolution is not necessary: if a resolution of about 600 dpi is obtained, it is effective to enhance tone (correctness in gradation) in addition to its attainment. Moreover, in the case where there occurs ink impact position displacement between rasters arising from the phenomenon as shown in FIG. 16B, the deterioration in the image quality can be controlled consequently by using a plurality of patterns for one level of gradation sequentially.

However, dot patterns affect the image quality largely, and in the case where plural kinds of patterns of dot arrangements each displaying the same level of gradation are arranged at random in the main scanning direction, there is the possibility that noises such as roughness and a sense of granularity may occur in the image. In order to prevent occurrence of these noises, it is necessary to use such a dot arrangement that is suited for the resolution and a dot size.

Although designing an arrangement of dot patterns in the main scanning direction in a large area makes it easy to control a spatial frequency characteristic of output images, it will use much capacity of memory, etc., because of a large arrangement matrix. In the case where the area of arrangement of dot patterns in the main scanning direction cannot be secured wide enough because of a constraint of memory capacity, a period of the area appears in the image, gives a sense of noise, and leads to deterioration in the image quality.

On the other hand, in the case where a plurality of dot patterns are arranged sequentially in the main scanning direction, a pattern arising from periodicity of the arranged dot patterns, such as a period of dot patterns repeated in the main scanning direction and a period thereof repeated in the sub scanning direction, may appear as noises, such as a streak, in the image.

FIG. 19 is an explanatory diagram of a printing result in the case where a matrix (4×1), in which four kinds of dot patterns for "level 2" are arranged, is created as a minimum unit and the matrix is used repeatedly in the main scanning direction (the horizontal direction in the figure). FIG. 20 is an explanatory diagram of a printing result in the case where a matrix (1×4), in which four kinds of dot patterns for "level 2" are arranged, is created as a minimum unit and the matrix is used repeatedly in a sub scanning direction (the vertical direction in the figure).

In this way, in the case where a matrix (A×1 or 1×A) having a fixed arrangement of a plurality of dot patterns in the main scanning direction or in the sub scanning direction (denoting an arrangement of A) is created as a minimum unit and the matrix is used repeatedly so as to correspond to the input pixel of the image, the matrix will be arranged in the sub scanning direction and in the main scanning direction. As a result, as shown in FIG. 19 and FIG. 20, the same dot patterns lie in a row in the sub scanning direction and in the main scanning direction, and a vertical streak and a horizontal streak in the arrangement directions may appear in the image to deteriorate the image quality.

SUMMARY OF THE INVENTION

This invention can provide a printing method, a print apparatus, a program, and a storage medium that can prevent a pattern arising from the periodicity of the dot arrangements from appearing in the image as noises such as a streak and print a high-quality image in the case where a plurality of different dot arrangements each displaying the same level of gradation of the input image data are used repeatedly in a unit of predetermined number of the dot arrangements.

In the first aspect of the present invention, there is provided a printing method for conducting printing using a printing head in which a plurality of printing elements are arranged in a column direction and printing on a printing medium is performed by scanning the printing head in a raster direction, the method comprising:

an allocating step of using an A×B matrix created by combining a plurality of different M×N dot arrangements in both raster and column directions as a minimum unit, the dot arrangements corresponding to the same level of input image data quantized into multivalued levels, and allocating the dot arrangements in the matrix to the input image data; and a printing step of forming dots on the printing medium on the basis of the dot arrangements of the matrix allocated to the input image data, wherein, in the matrix, A kinds of dot arrangements are arranged for each raster, the repetition sequence of the A kinds of dot arrangements in the raster direction is the same for every raster, and a starting position of the repetition sequence is different in every raster.

In the second aspect of the present invention, there is provided a printing apparatus for conducting printing using a printing head in which a plurality of printing elements are arranged in a column direction and printing on a printing medium is performed by scanning the printing head in a raster direction, the apparatus comprising:

allocating means for using an A×B matrix created by combining a plurality of different M×N dot arrangements in both raster and column directions as a minimum unit, the dot arrangements corresponding to the same level of input image data quantized into multivalued levels, and allocating the dot arrangements in the matrix to the input image data; and printing control means for forming dots on the printing medium on the basis of the dot arrangements of the matrix allocated to the input image data, wherein, in the matrix, A kinds of dot arrangements are arranged for each raster, the repetition sequence of the A kinds of dot arrangements in the raster direction is the same for every raster, and a starting position of the repetition sequence is different in every raster.

In the third aspect of the present invention, there is provided a program for conducting printing using a printing head in which a plurality of printing elements are arranged in a column direction and printing on a printing medium is performed by scanning the printing head in a raster direction, the program allowing a computer to execute:

an allocating step of using an A×B matrix created by combining a plurality of different M×N dot arrangements in both raster and column directions as a minimum unit, the dot arrangements corresponding to the same level of input image data quantized into multivalued levels, and allocating the dot arrangements in the matrix to the input image data; and a printing step of forming dots on the printing medium on the basis of the dot arrangements of the matrix allocated to the input image data, wherein, in the matrix, A kinds of dot arrangements are arranged for each raster, the repetition sequence of the A kinds of dot arrangements in the raster direction is the same for every raster, and a starting position of the repetition sequence is different in every raster.

In the fourth aspect of the present invention, there is provided a storage medium storing the program of the third aspect of the present invention and capable of being read by computer.

In this invention, a matrix of A×B is created by combining a plurality of different dot arrangements, each displaying the same level of gradation of the input image in the raster direction and in the column direction (the matrix is paved with plural dot arrangements), and this matrix is allocated to the input image data as a minimum unit. By this arrangement, the periodicity of the dot patterns in the image yields only a high spatial frequency characteristic, thus reducing the sense of noise in the image further; therefore, the image quality can be increased. Human vision has a highest sensitivity of perception for a period of approximately 200 $\mu$m when the observation distance is about 30 cm, and when the period goes to a higher spatial frequency or to a lower spatial frequency, the sensitivity of perception becomes dull. Moreover, when the dot size is the diameter of approximately 30 mm, the dimensions of each dot arrangement that corresponds to one input image data (one input pixel) is set to $\frac{1}{600}$ inch square, and as a matrix, a matrix of 4×4 created by combining four dot arrangements in the raster direction and in the column direction is used, whereby the repetition period of the matrix can be set to a high spatial frequency, to which the human visual characteristic has dull sensitivity.

Moreover, in the matrix that is formed of these pattern arrangements, by making an arrangement sequence of several kinds of pattern arrangements different for each raster, the periodicity of the patterns is made to have a higher spatial frequency characteristic, and, consequently, the sense of noise caused by a streak, etc., in the image can be reduced.

Furthermore, as the matrix, a matrix such that A kinds of dot arrangements are arranged in each raster, a repetition sequence of the dot patterns in the raster direction is the same for every raster, and a starting position of the repetition sequence is different in each raster is used, whereby the periodicity of the patterns can be controlled to exist in a higher frequency, and consequently the sense of noise caused by a streak, etc., in the image can be reduced further.

Thus, in this invention, a matrix of A×B is created by combining a plurality of different dot arrangements, each displaying the same level of gradation of the input image both in the raster direction and in the column direction, and this matrix is allocated to the input image data as a minimum unit, whereby occurrence of a streak caused by continuation of the same dot arrangement in the raster direction and in the column direction is eliminated and a high-quality image can be printed.

Moreover, by using a matrix of 4×4 created by combining four dot arrangements in the raster direction and in the column direction, setting the dimensions of each dot arrangement to 1/600 inch square, and setting the diameter of the dot formed on the printing medium to 30 μm, the sense of noise caused by a streak, etc., appearing in the image can be reduced, so that a higher-quality image can be printed. Moreover, an arrangement sequence of a plurality of dot patterns in the matrix can be set, for example, in such a way that the repetition sequence of the dot patterns in the raster direction is the same for every raster and a starting position of the repetition sequence is different in each raster. In this case, control for making the periodicity of the dot patterns in the image yield a high spatial frequency characteristic becomes easier to carry out, thus reducing the sense of noise in the image further; therefore the image quality can be increased.

The above and other objects, effects, features and advantages of the present invention will become more apparent from the following description of embodiments thereof taken in conjunction with the accompanying drawings.

BRIEF DESCRIPTION OF THE DRAWINGS

FIG. 19 is an explanatory diagram for an example of the conventional composition of the matrix; and FIG. 20 is an explanatory diagram for another example of the conventional composition of the matrix.

DETAILED DESCRIPTION OF PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The term "print medium" or "print sheet" includes not only paper used in common printing apparatus, but cloth, plastic films, metal plates, glass, ceramics, wood, leather or any other material that can receive ink. This term will be also referred to as "paper".

Further, the word "ink" (or "liquid") should be interpreted in a broad sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
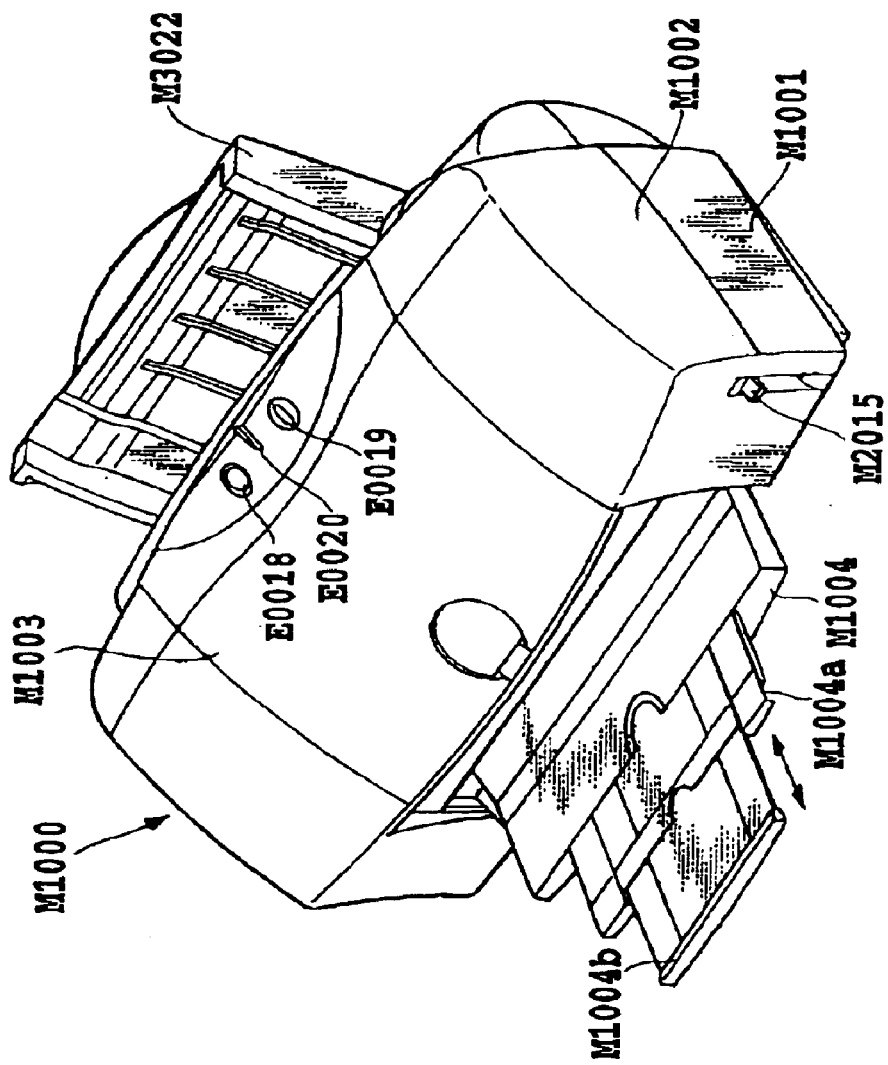
FIG. 1 is a perspective view showing an external construction of an ink jet printer as one embodiment of the present invention.
Figure 2:
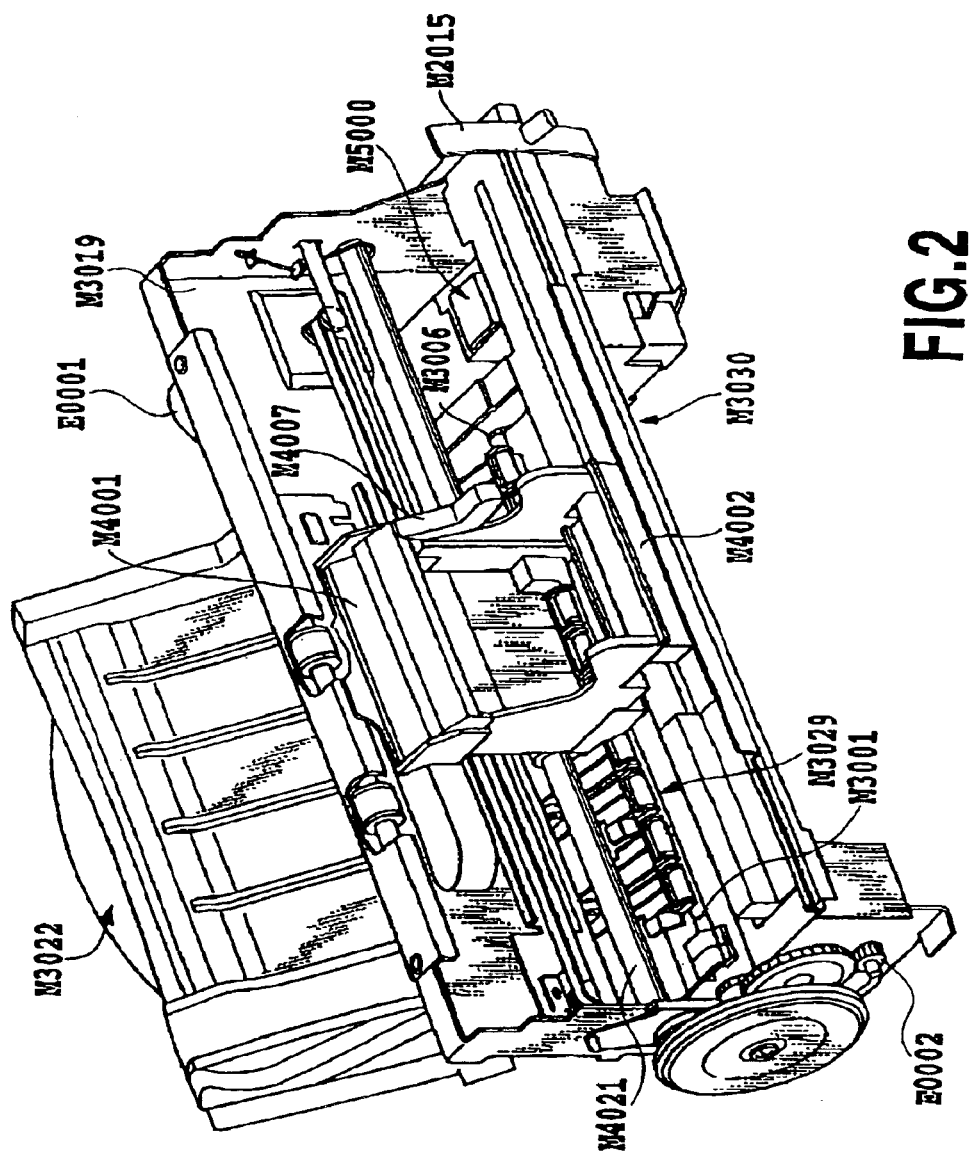
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises; an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position, and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
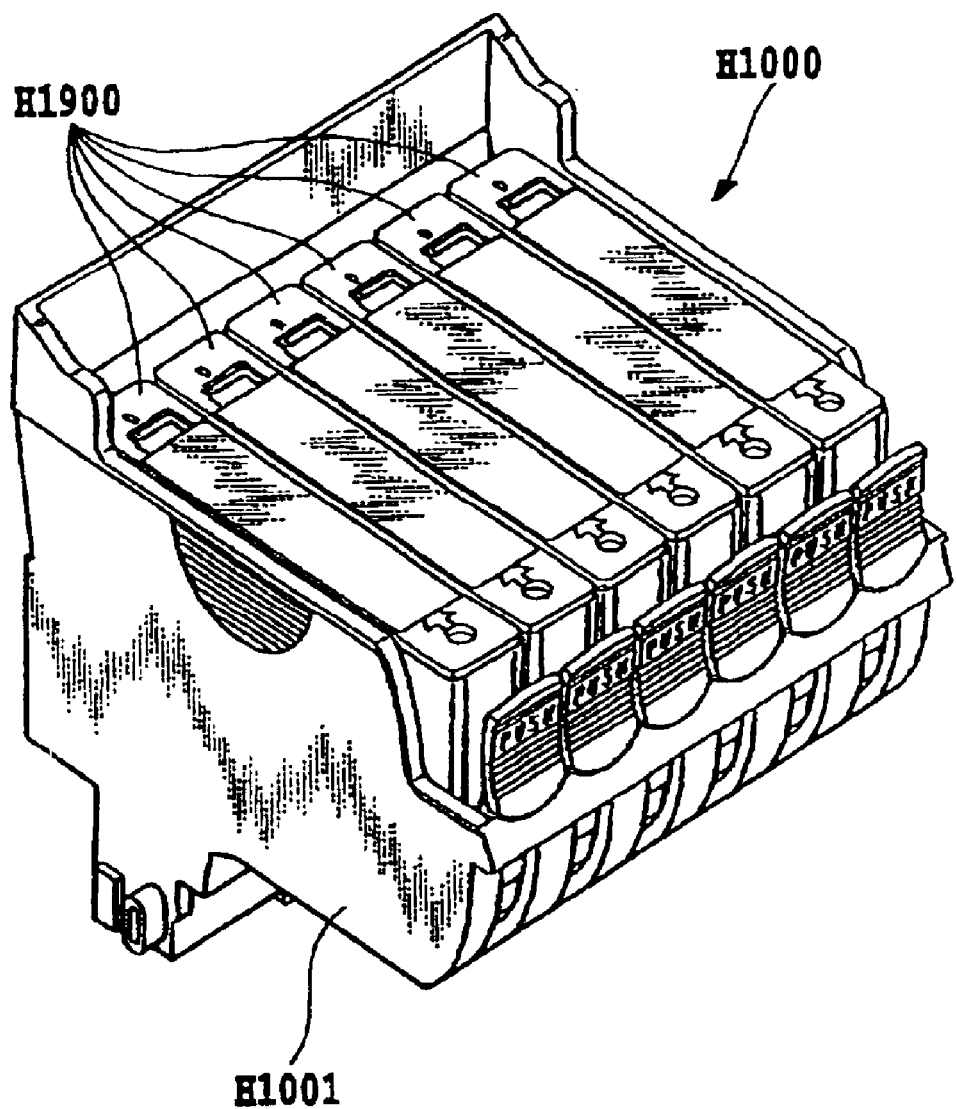
FIG. 3 is a perspective view showing an assembled print head cartridge used in the printer of one embodiment of the present invention.
Figure 4:
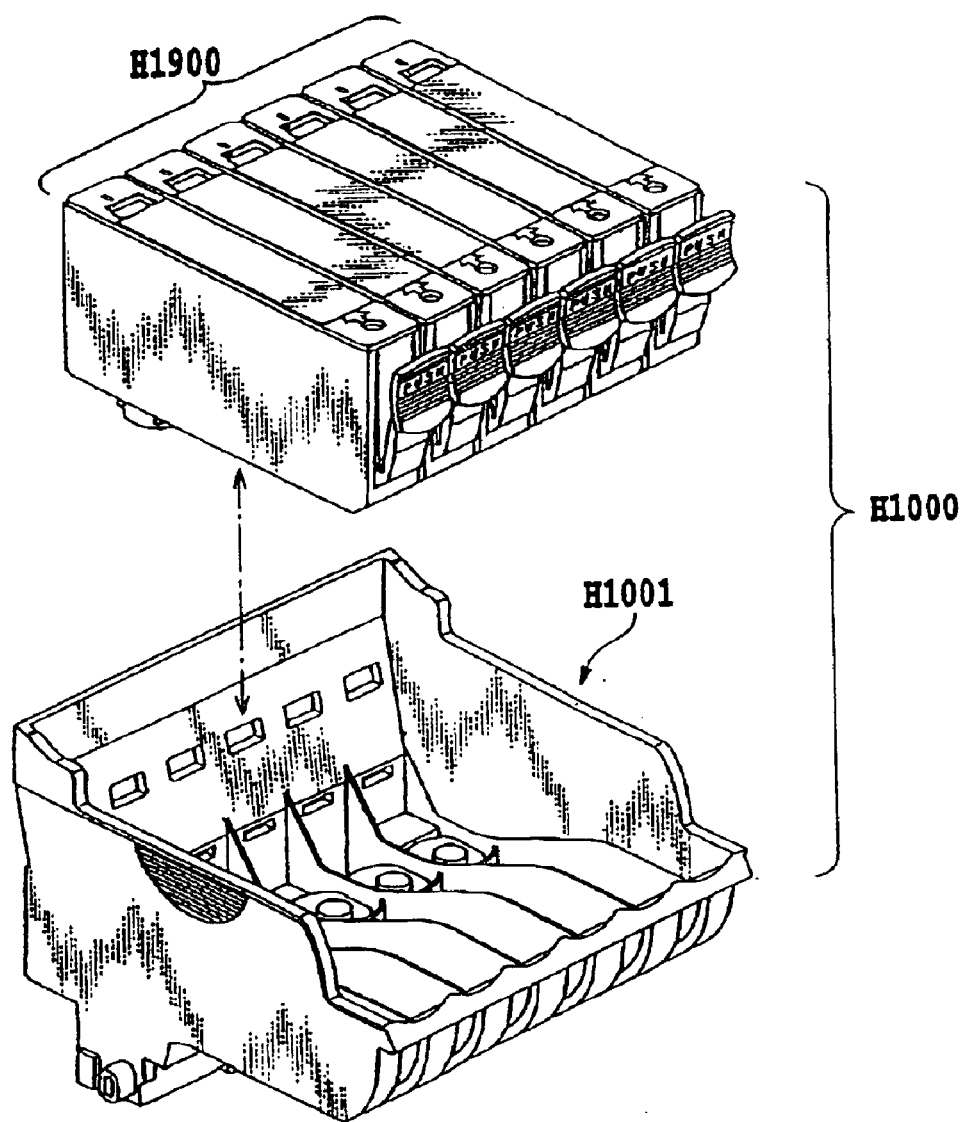
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as a photograph. As shown in FIG. 4, these individual ink tanks are removably mounted to the print head H1001.

Figure 5:
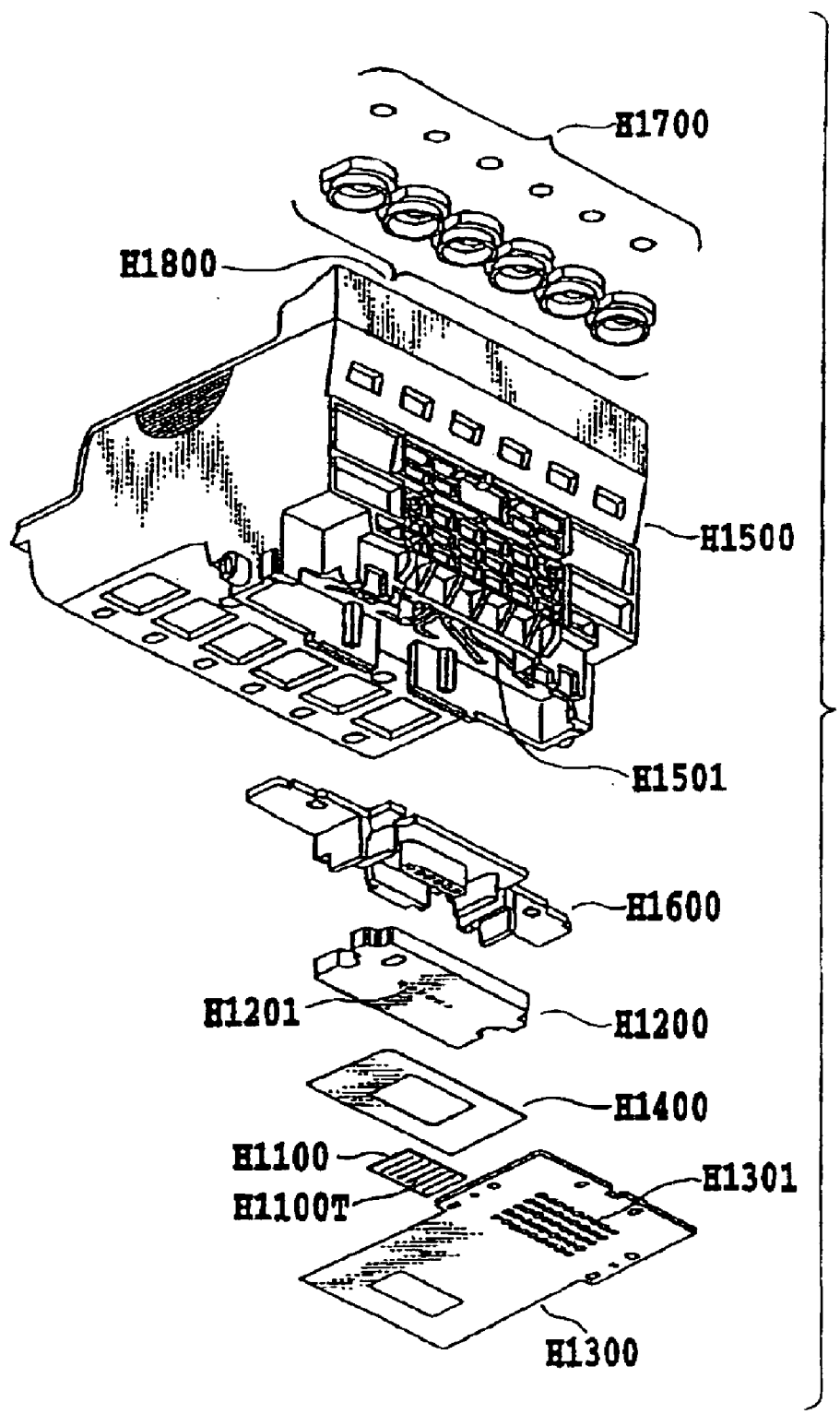
FIG. 5 is an exploded perspective view of the print head of FIG. 4 as seen diagonally below.

The print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200, which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A rubber seal H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the rubber seal H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member (not shown) made of a material such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a fed document, instead of printing on the printing medium, as the scanner moves in the main scan direction. Alternating the scanner reading operation in the main scan direction and the document feed in the sub-scan direction enables one page of document image information to be read.

Figure 6:
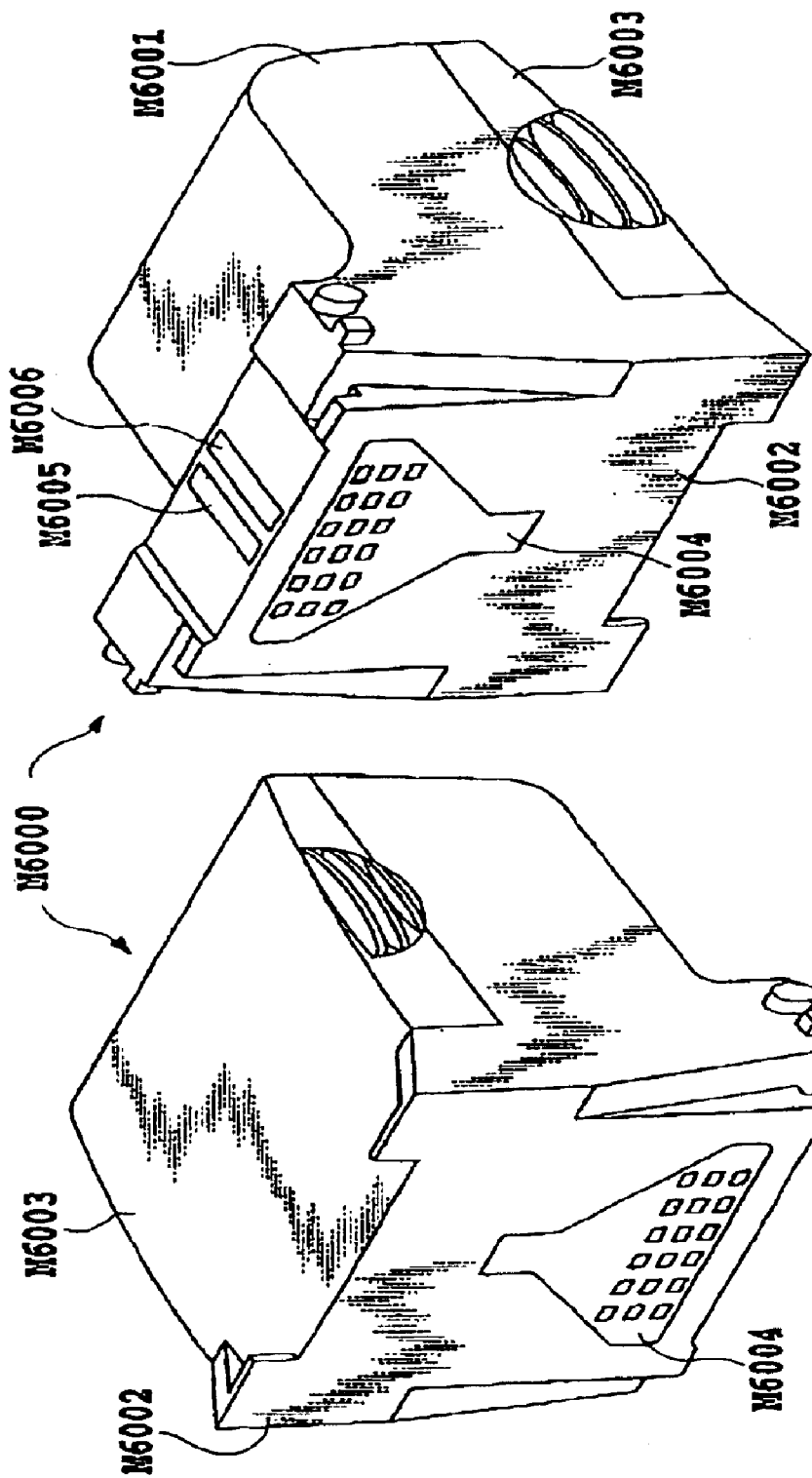
FIGS. 6A and 6B are perspective views showing a construction of a scanner cartridge upside down which can be mounted in the printer of one embodiment of the present invention instead of the print head cartridge of FIG. 3.

FIGS. 6A and 6B show the scanner M6000 upside down to explain its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source (not shown) inside the scanner. The light emitted from the light source is in irradiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
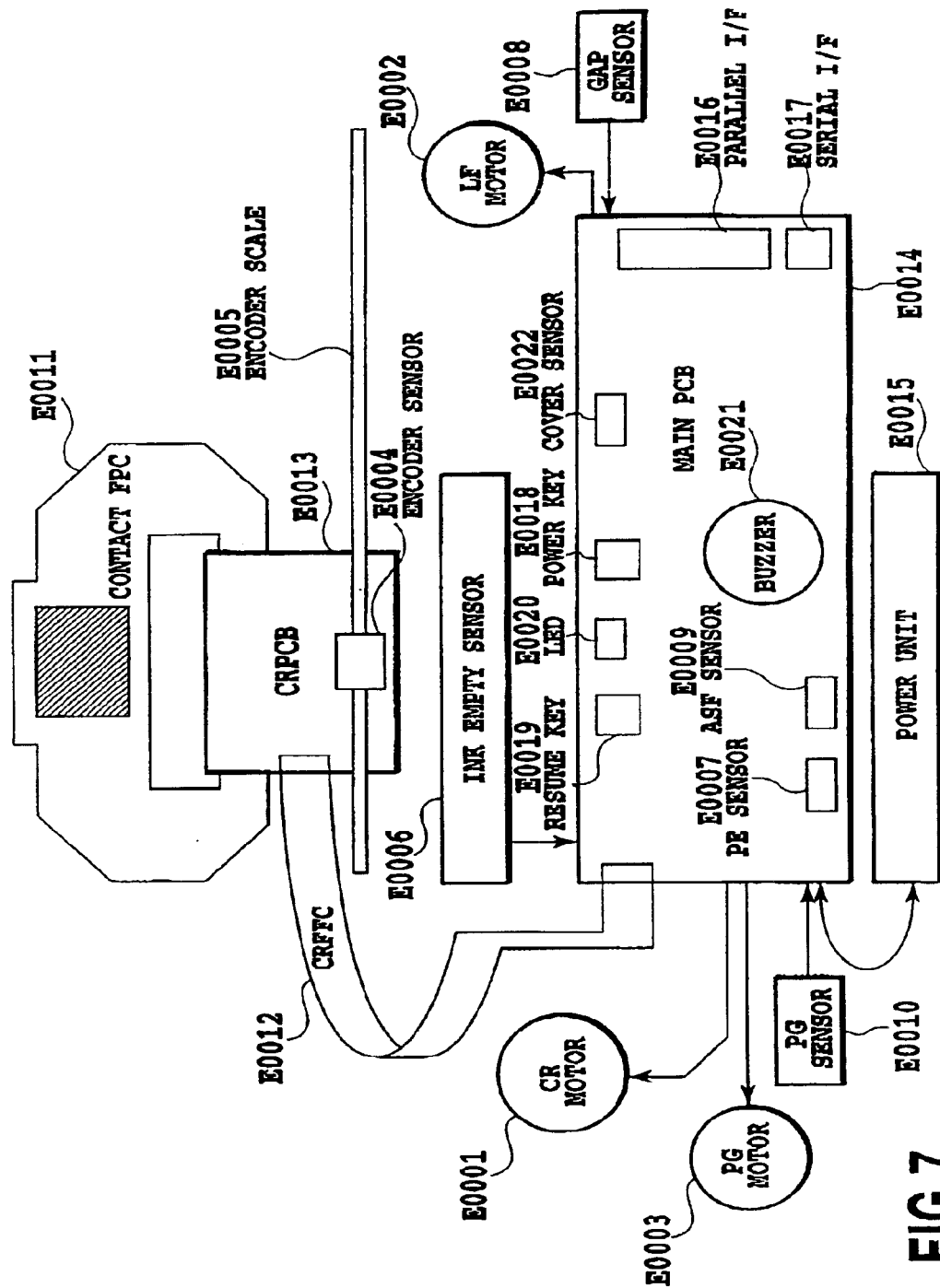
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8B:
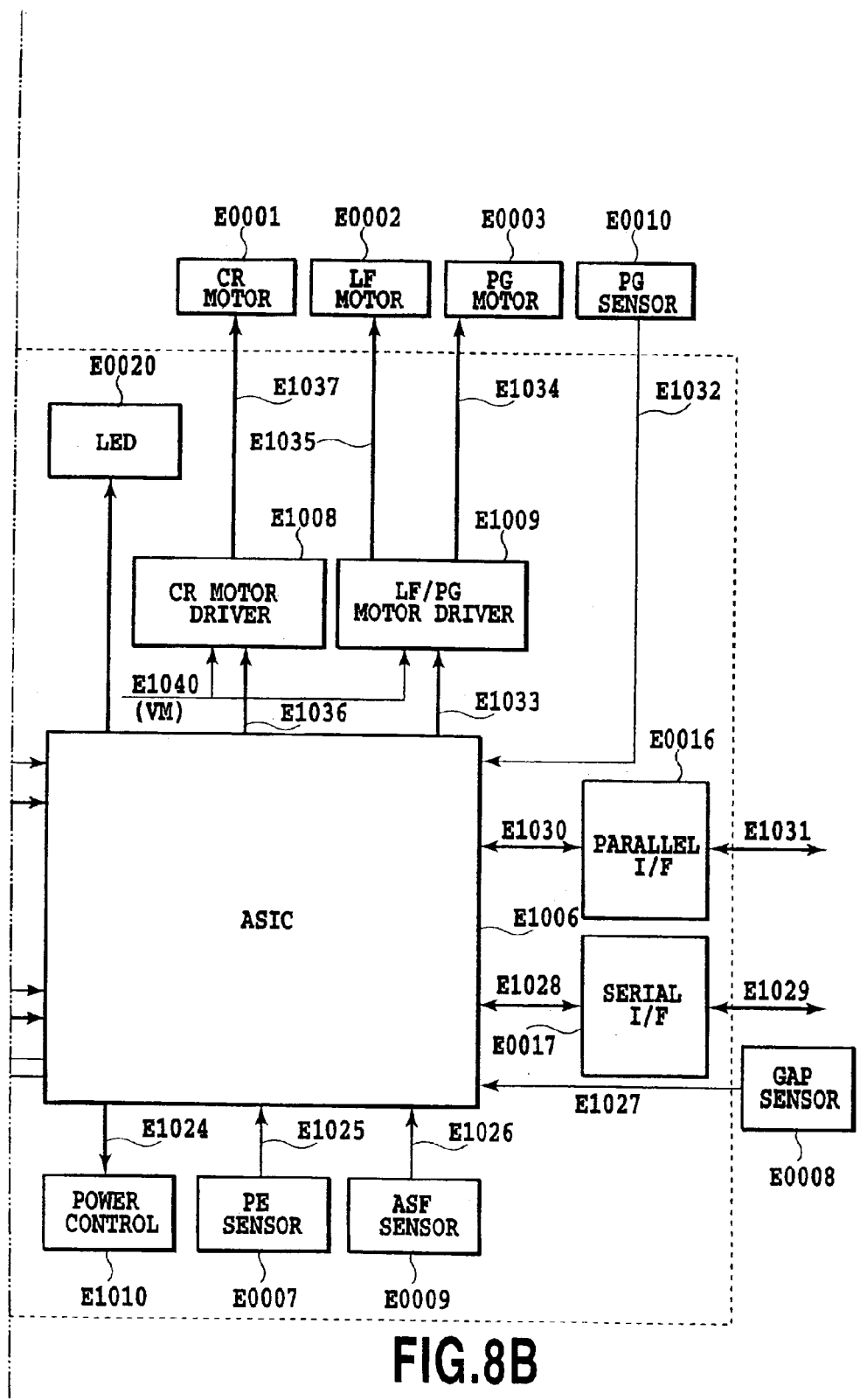
FIG. 8 is a diagram showing the relation between FIGS. 8A and 8B, FIGS. 8A and 8B being block diagrams representing an example inner configuration of a main printed circuit board (PCB) in the electric circuitry of FIG. 7.

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASPS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
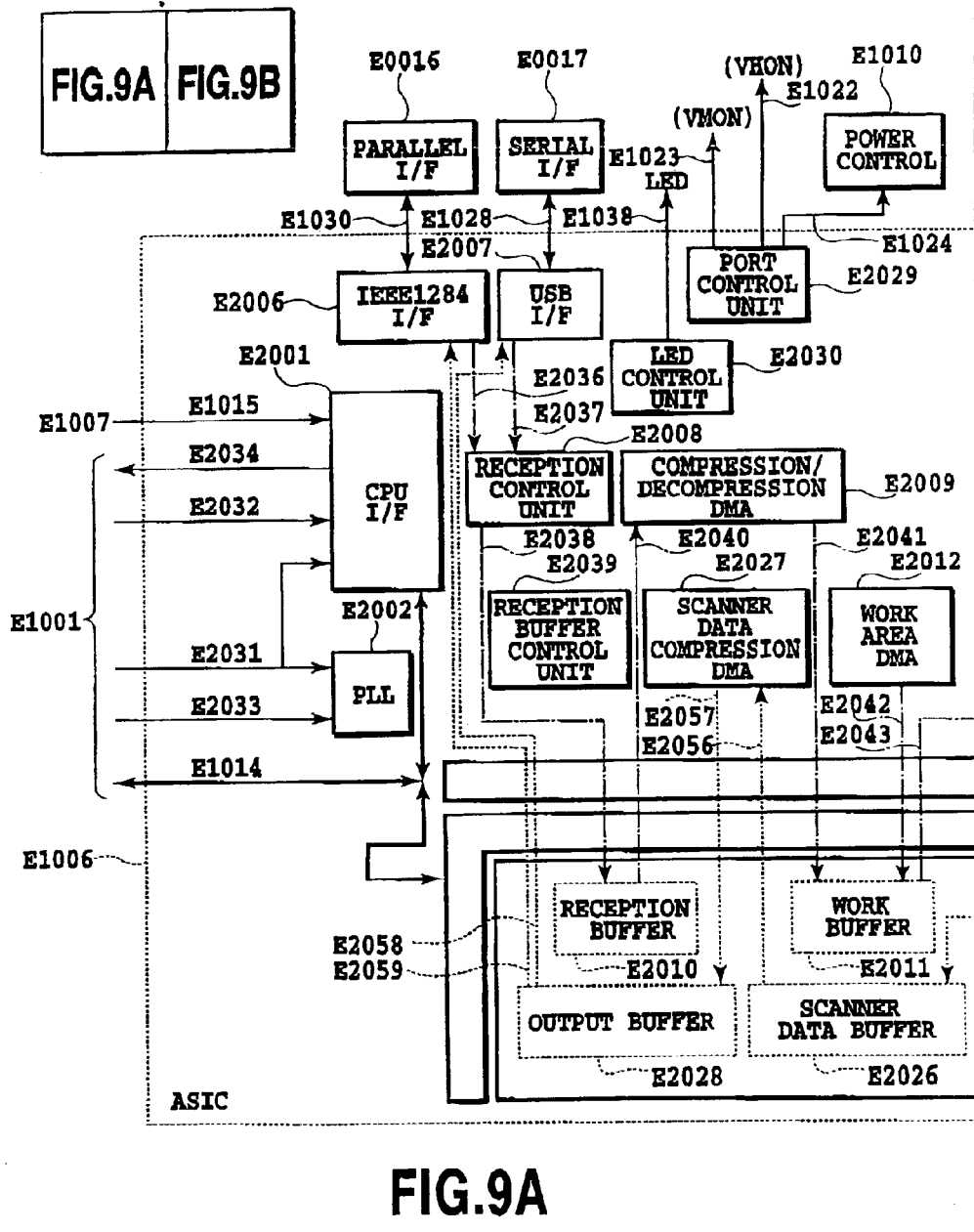
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
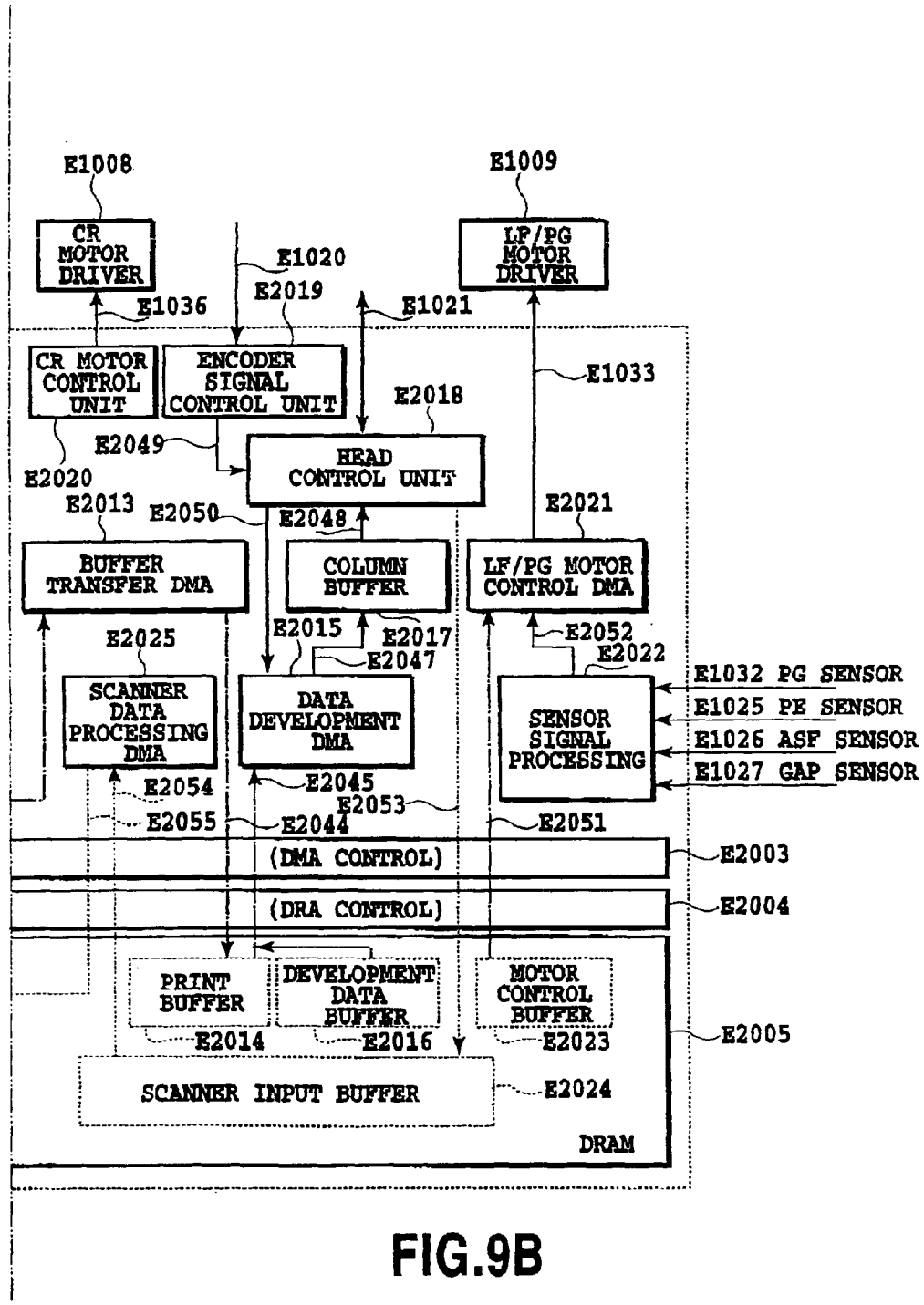

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most parts of the ASIC E1006.

Denoted E2001 is a CPU interface (CPU I/F), which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit which performs read/write operations on the DRAM E2005 by switching between the DRAM access from the CPU E1001 through the control bus and the DRAM access from a DMA control unit E2003 described below.

The DMA control unit E2003 accepts request signals (not shown) from various blocks and outputs address signals and control signals (not shown) and, in the case of write operation, write data E2038, E2041, E2044, E2053, E2055, E2057, etc., to the DRAM control unit to make DRAM accesses. In the case of read operation, the DMA control unit E2003 transfers the read data E2040, E2043, E2045, E2051, E2054, E2056, E2058, and E2059 from the DRAM control unit E2004 to the requesting blocks.

Denoted E2006 is an IEEE 1284 I/F which functions as a bi-directional communication interface with external host devices (not shown) through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices (not shown) through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 In the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers this sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1010 through the CPU I/F E2001 to output the head power ON signal E1022, the motor power ON signal E1023 and the power supply control signal E1024.

5. Operation of Printer

Figure 10:
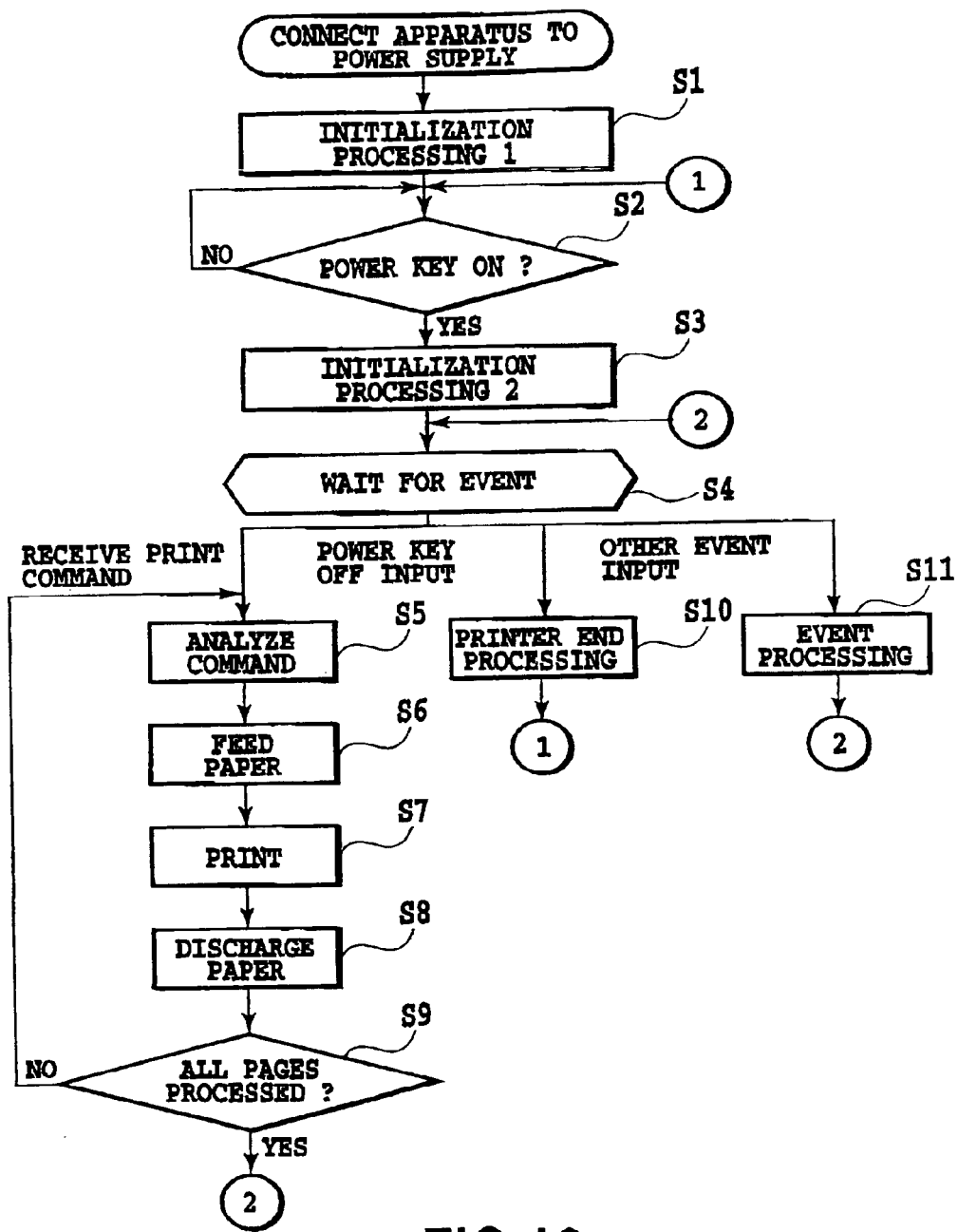
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, step S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and other criteria, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and the print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

[Construction of a Head]

Here, a composition and arrangement of a group of ejection openings of the head H1001 that is used in this embodiment will be described. The nozzles H1100 are composed of the ejection openings.

Figure 11:
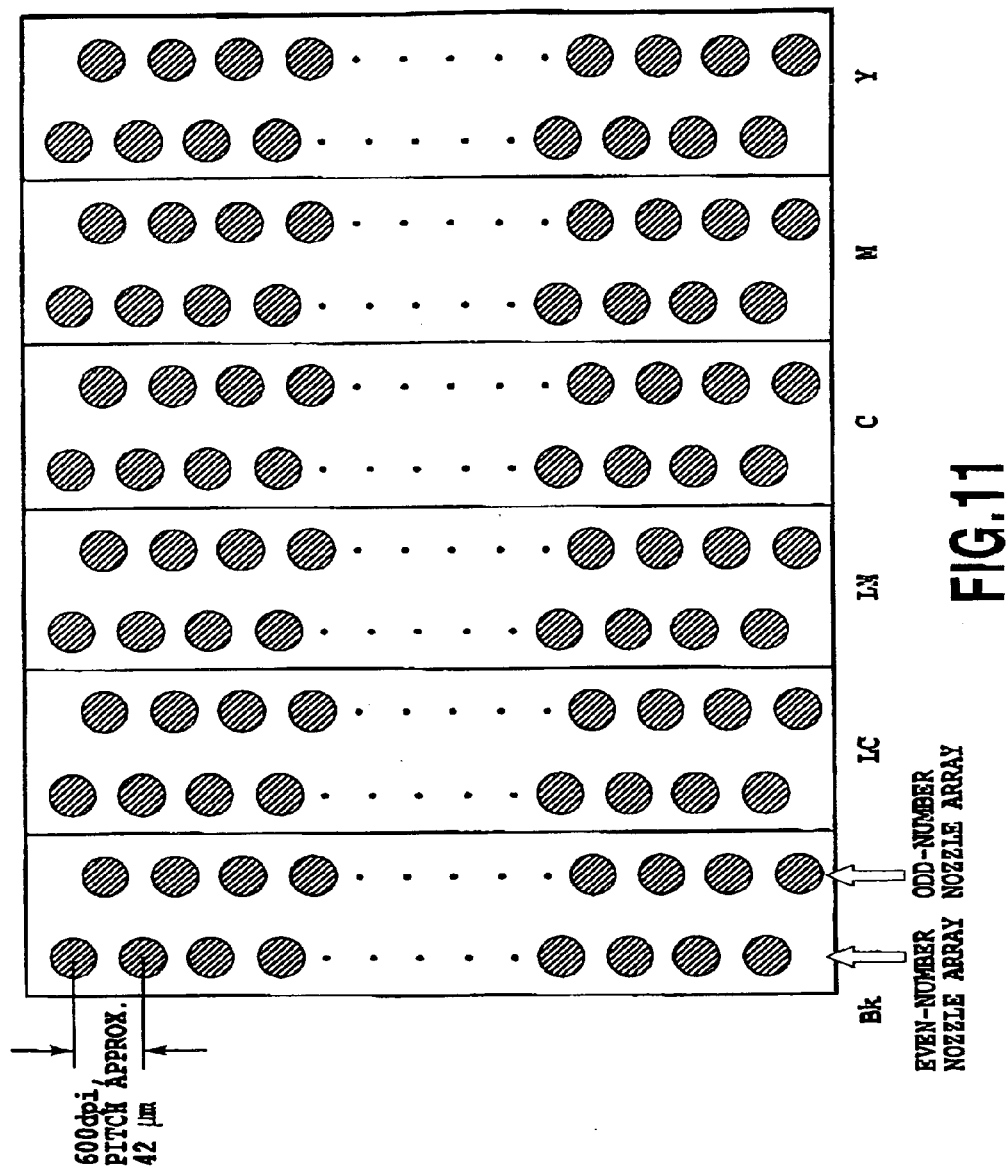
FIG. 11 is an explanatory diagram for a nozzle array of the print head in FIG. 4.

FIG. 11 is a schematic front view of a head for realizing high-density printing that is used in this embodiment. In this example, 128 ejection openings are arranged for one array with a pitch of 600 dpi (dot per inch) (i.e., approximately 42 $\mu$m pitch), and two ejection opening arrays ejecting one color of an ink are provided in the main scanning direction (carriage scanning direction) with the one ejection opening array shifted from the other by approximately 21 $\mu$m, and hence 256 total ejection openings enable printing with a resolution of 1200 dpi. Among two ejection opening arrays both ejecting one color of an ink, one array acts as an array for printing an odd-number raster (also called an "odd-number nozzle array") and the other array acts as an array for printing an even-number raster (also called an "even-number nozzle array"). Moreover, in the example shown in the figure, such ejection opening arrays are arranged in parallel in the main scanning direction, corresponding to 6 colors of inks, and 12 total lines of ejection opening arrays constitute a monolithically structured head construction capable of printing of 1200 dpi for 6 colors of inks. Note that since ejection openings for two colors arranged side by side are manufactured simultaneously as one chip and consequently three discrete chips are bonded together side by side, each pair of structurally adjoining two chips (a pair of black (Bk) and light cyan (LC), a pair of light magenta (LM) and cyan (C), and a pair of magenta (M) and yellow (Y)) has the similar driving conditions as compared to other chips.

[Printing Method]

Figure 18:
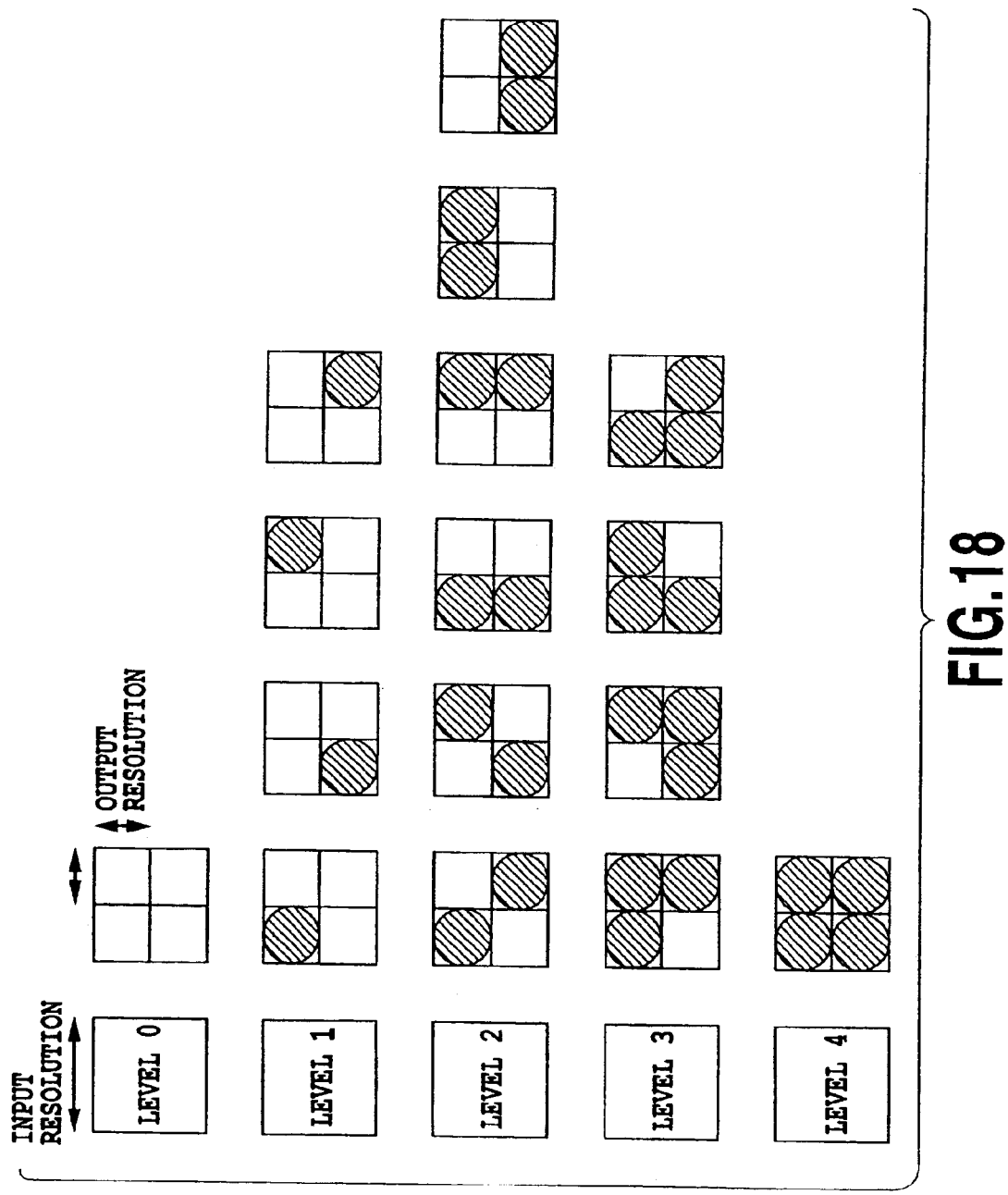
FIG. 18 is an explanatory diagram for dot arrangements in 2×2 pixels for representing pseudo gradation representation.

The head used in this embodiment and shown in FIG. 11 is one that can conduct printing of 1200 dpi. In this example, explanation will be given assuming that the resolution of an inputted image is 600 dpi at maximum and four pixels of 2×2 are used to print one input image data at the time of printing. Moreover, each input image data is in 5 levels of gradation, and dot patterns (patterns of dot arrangement), each of which corresponds to each level of gradation, have been determined in 2×2 pixels so that the 5 levels of gradation are represented in region of 2×2 pixels at the time of printing. In this case, as in the case described referring to FIG. 18, a plurality of dot patterns can be considered for "level 1" to "level 3."

By allowing the plurality of dot patterns to be used for the same level of gradation, it is possible to control biased use frequency of the nozzle (in this specification, if not otherwise specified, the nozzle means comprehensively the ejection opening, a liquid passage communicating to this, and an element for generating energy used for ejecting the ink), and consequently to prevent the deterioration in the image quality. Moreover, shortening of the life of a particular nozzle due to increased frequency of use thereof can be avoided. In the printing system of this embodiment, it is considered that the even-number nozzles and the odd-number nozzles are used equally as much as possible.

Figure 12:
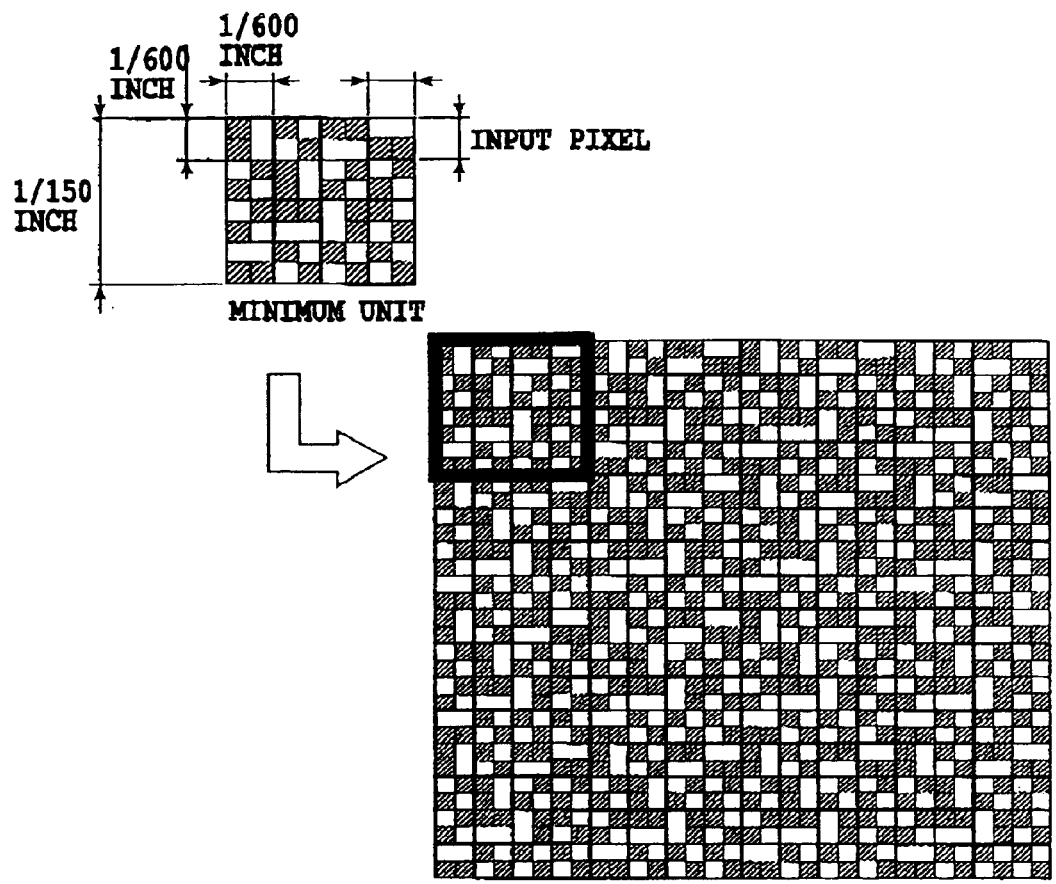
FIG. 12 is an explanatory diagram for an example of the composition of the matrix in an embodiment of this invention.

In this embodiment, as shown in FIG. 12, a matrix (4×4) in which four dot patterns are arranged both in the main scanning direction corresponding to the raster direction (a horizontal direction in the figure) and in the sub scanning direction corresponding to the column direction (a vertical direction in the figure) are specified as a minimum unit of printing and the printing is performed by using this matrix repeatedly in the main scanning direction and in the sub scanning direction. In the minimum-unit matrix (a set of dot patterns), different dot patterns each displaying the same level of gradation are arranged at random.

FIG. 12 shows an example of the composition of the matrix for a level of gradation of "level 2," where a plurality of dot patterns, more specifically, four dot patterns each representing the "level 2", are arranged at random both in the main scanning direction and in the sub scanning direction. In this example, the diameter of the ink dot to be formed on a print medium is set to 50 $\mu$m, and the input image size corresponding to one dot pattern is determined to be 1/600 inch×1/600 inch. Then, an image whose level of gradation is "level 2" is printed by using this minimum-unit matrix (4×4) repeatedly in the main scanning direction and in the sub scanning direction. The periodicity of the dot patterns in the image will yield a characteristic having a spatial frequency as high as 1/150 inch, thus reducing the sense of noise in the image; the image quality can be increased.

Thus, the input image data quantized to multivalued levels is allocated to the dot arrangements (dot pattern) of M×N (in this embodiment, 2×2) as the pseudo half tone processing. In doing the allocation, a matrix of A×B (in this embodiment, 4×4) created by combining a plurality of different dot arrangements each displaying the same level of gradation of the input image in the raster direction and in the column direction is used, and this matrix is allocated to the input image as a minimum unit. In the actual printing operation, allocating input image data to the matrix in this way can be performed by using appropriate hardware, for example, part of a circuit configuration of AS1C E1006, as well as by using software loaded in CPU E1001.

[Another Embodiment]

Figure 13:
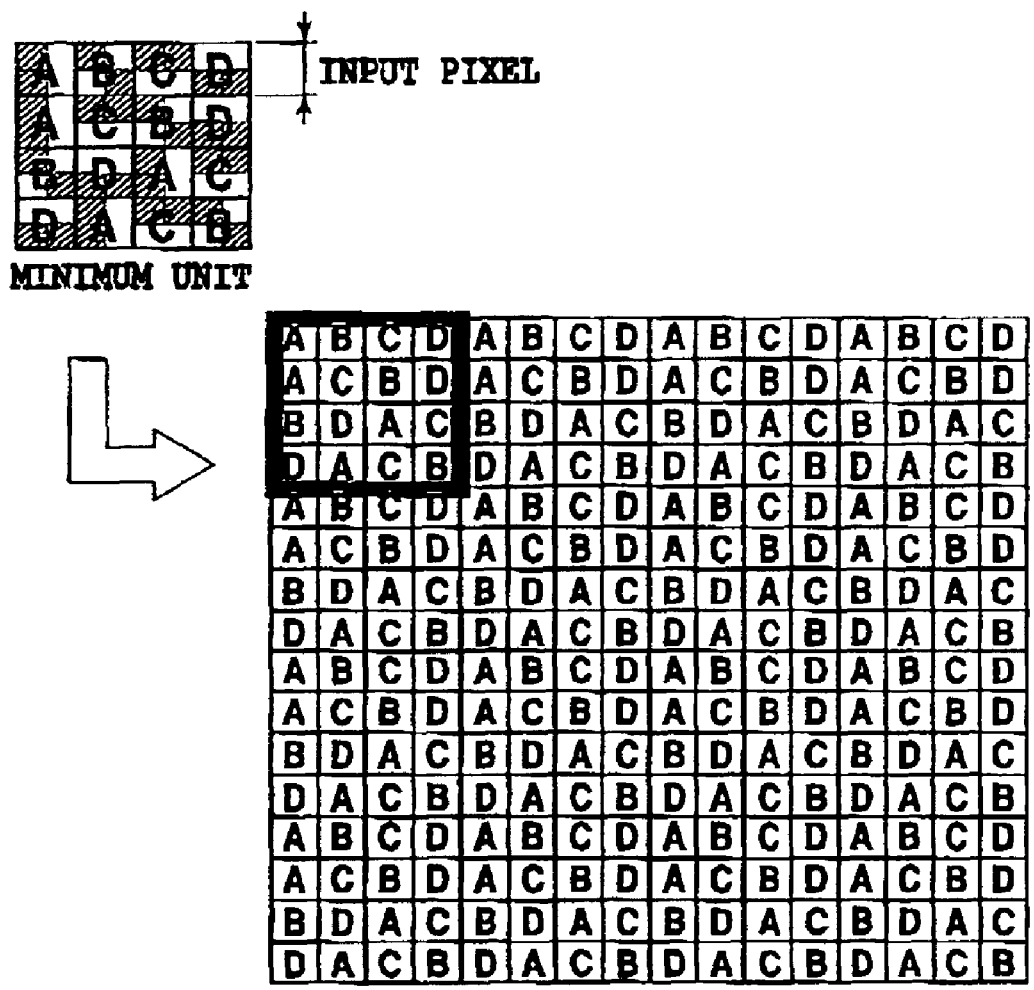
FIG. 13 is an explanatory diagram for another example of the composition of the matrix in an embodiment of this invention.

FIG. 13 is an explanatory diagram for an example of the composition of the matrix in the second embodiment of this invention.

In this embodiment, as in the case of the embodiment described above, a matrix of (4×4) in which four dot patterns are arranged both in the main scanning direction (a horizontal direction in the figure) and the sub scanning direction (vertical direction in the figure) is created as a minimum unit, which is used repeatedly in the main scanning direction and in the sub scanning direction to conduct printing. Note that in this embodiment, as shown in FIG. 13, different dot patterns each displaying the same level of gradation are arranged in a different order for each raster along the main scanning direction in its minimum-unit matrix (a set of dot patterns).

FIG. 13 shows an example of the composition of the matrix for a level of gradation of "level 2." In the matrix, four dot patterns A, B, C, and D each for "level 2" are arranged on each of the same raster, wherein an arrangement sequence of dot patterns A, B, C, and D is different for each raster. In addition, in this example, the diameter of the ink dot to be formed on a print medium is set to 50 μm, and an input pixel size corresponding to one dot pattern is set to 1/600 inch×1/600 inch. Then, an image whose level of gradation is "level 2" is printed by using this minimum-unit matrix (4×4) repeatedly in the main scanning direction and in the sub scanning direction. In this embodiment, the periodicity of the dot patterns in the image will be one that yields a higher spatial frequency characteristic, thus reducing the sense of noise in the image further; therefore, the image quality can be increased.

Figure 14:
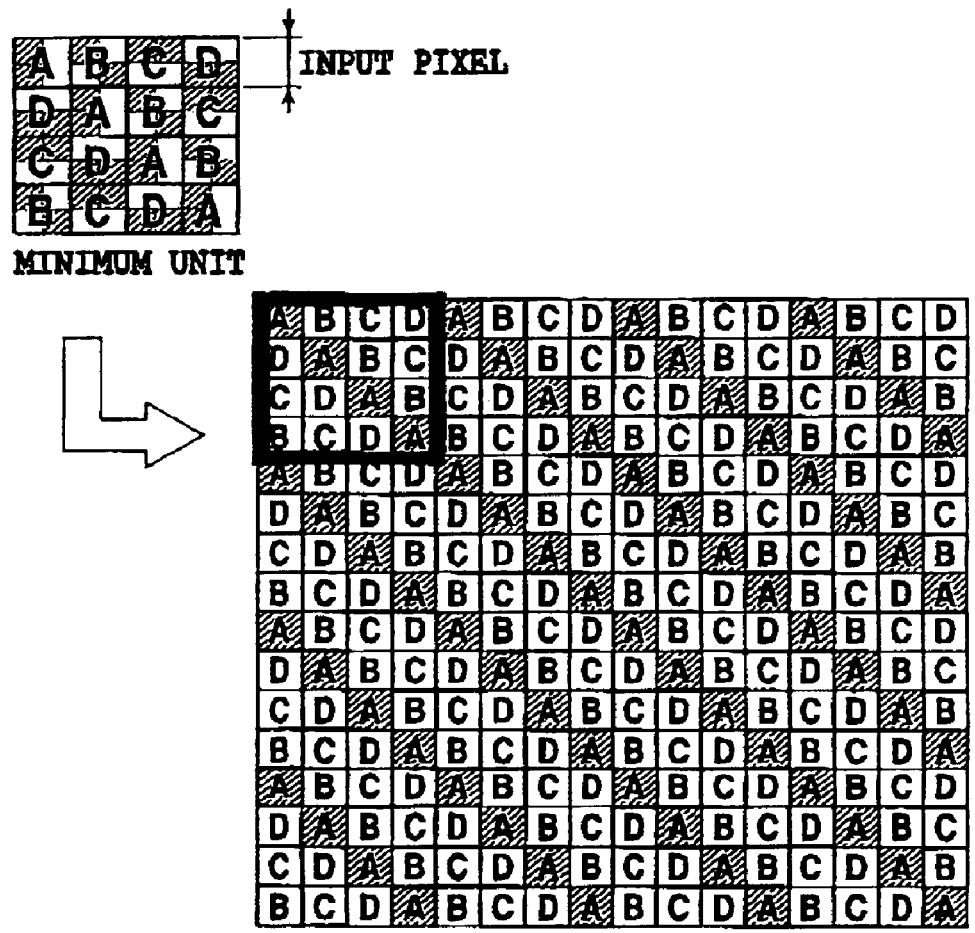
FIG. 14 is an explanatory diagram for another example of the composition of the matrix in an embodiment of this invention.
Figure 15:
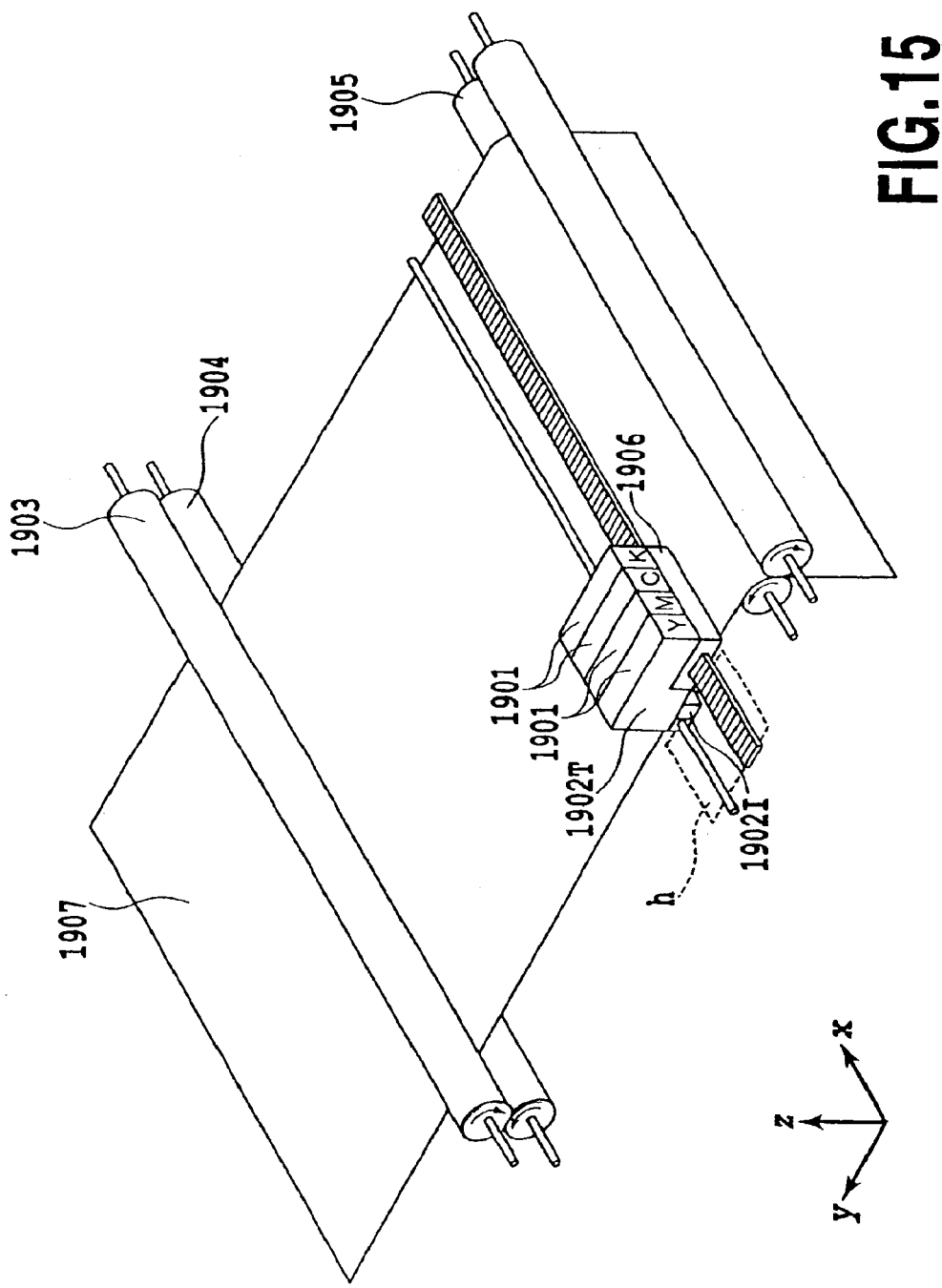
FIG. 15 is a simplified version of a perspective view showing a serial type color printer.
Figure 16A:
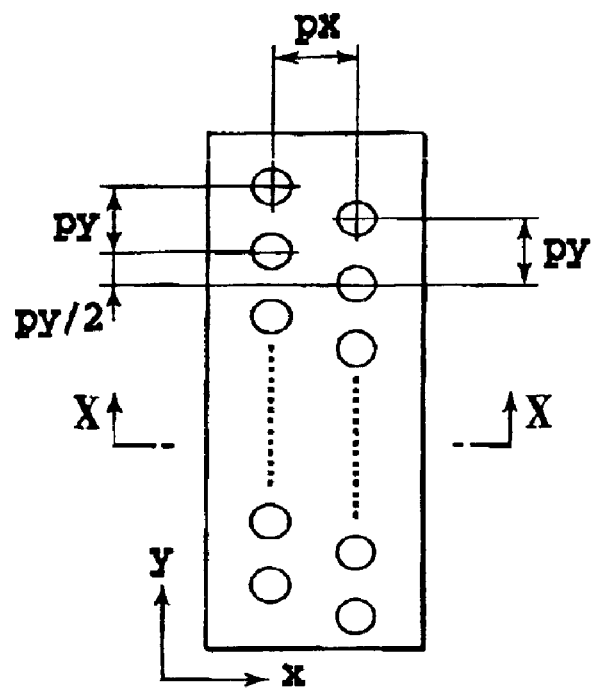
FIG. 16A is an explanatory diagram of an example of the nozzle array of the print head for realizing a high resolution.
Figure 16B:
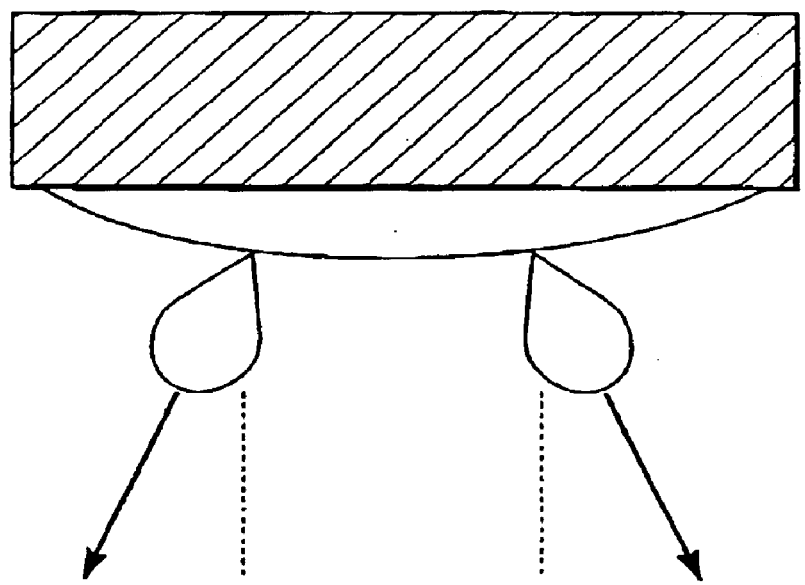
FIG. 16B is a partial enlarged cross sectional view taken along line X—X in FIG. 16A.
Figure 17:
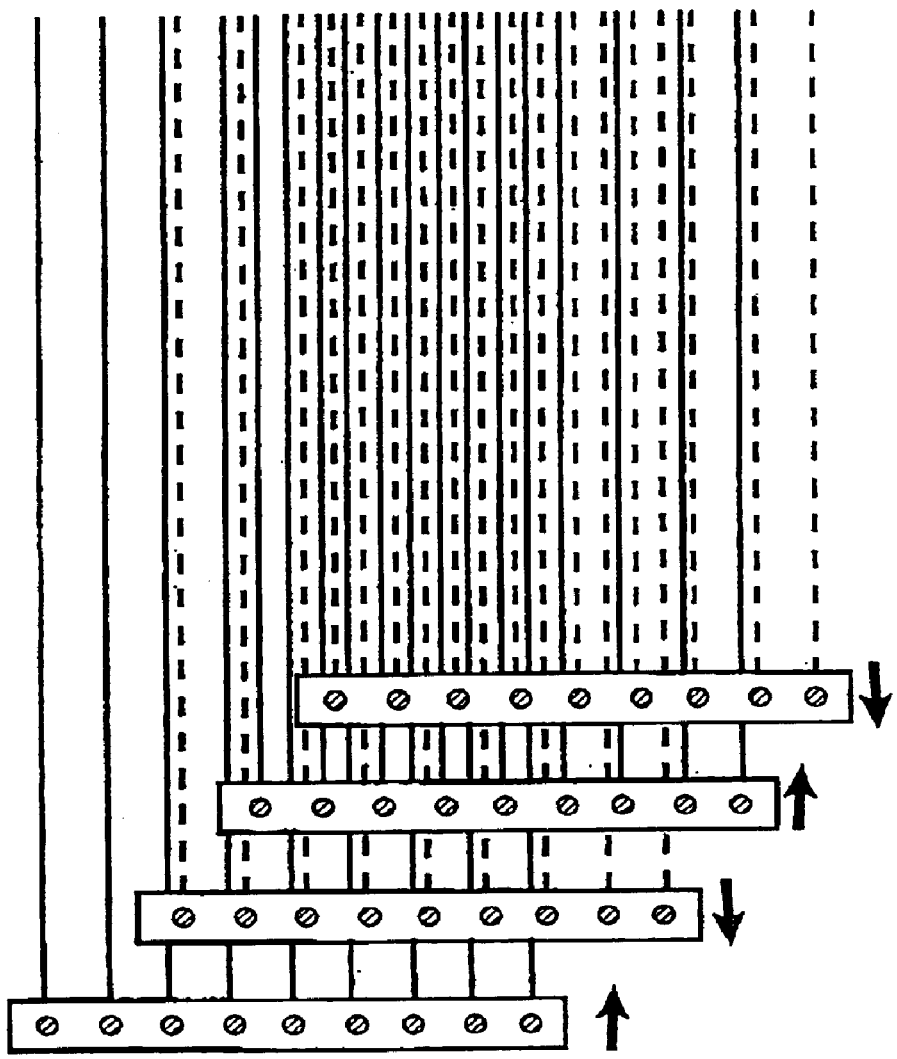
FIG. 17 is a schematic diagram for explaining the interlace printing method.

FIG. 14 is an explanatory diagram of an example of the composition of the matrix in the third embodiment of this invention.

In this embodiment, as in the case of the embodiment described above, a matrix of dot patterns (4×4) in which four dot patterns are arranged in the main scanning direction (horizontal direction in the figure) and in the sub scanning direction (vertical direction in the figure) is created as a minimum unit, which is used repeatedly in the main scanning direction and in the sub scanning direction to conduct printing. Note that in this embodiment, as shown in FIG. 14, different dot patterns with the same level of gradation are arrayed in a predetermined sequence in each raster along the main scanning direction in the minimum-unit matrix (a set of dot patterns). The arrangement sequence of dot patterns in this example is set in such a way that repetition sequences of the dot patterns in the raster direction are set identical for each raster and a starting position of the repetition sequence is made different in each raster.

FIG. 14 shows an example of the composition of the matrix for a level of gradation of "level 2," and in the matrix, four dot patterns A, B, C, and D each displaying "level 2" are arranged on each of the same raster. The arrangement sequence of the dot patterns A, B, C, and D is set in such a way that the repetition sequence of the dot patterns in the raster direction is set always to A, B, C, and D, and the starting position of the repetition sequence is set different in each raster. The starting position of the repetition sequence of the dot patterns A, B, C, and D may be staggered by one dot pattern for every raster as shown in this example, but also may be staggered by a predetermined number of dot patterns for each raster in the predetermined direction. Furthermore, also in this example, the diameter of each input dot to be formed on the print medium is set to 50 μm, and an input pixel size corresponding to one dot pattern is set to 1/600 inch×1/600 inch. Then, an image whose level of gradation is "level 2" is printed by using this minimum-unit matrix (4×4) repeatedly in the main scanning direction and in the sub scanning direction. In this embodiment, a control necessary to make the periodicity of the dot patterns in this image yield a high spatial frequency characteristic becomes easier to perform, thus reducing the sense of noise in the image further; therefore the image quality can be increased.

Specifically, there is only one type of repetition sequence of the dot patterns (in FIG. 14, the sequence of A, B, C, and D) in the raster direction, with only a repetition starting position varied. Accordingly, a printing operation can be accomplished by using a relatively simple configuration to allocate the dot patterns to the input image data. If random numbers are used to randomly set the repetition sequence of the dot patterns in the raster direction, the configuration may be complicated, e.g., a random number generator may be required. Further, the arrangement sequence of dot patterns may make images noisier. In this regard, by using only one type of the repetition sequence of dot patterns in the raster direction and varying the repetition starting position as in the present embodiment, the repetition sequence of dot patterns becomes regular to some degree. This regularity enables the positive exclusion of the possibility of causing the arrangement sequence of dot patterns to make images noisier.

Alternatively, the same repetition sequence of dot patterns in the column direction may be used for all columns, with the repetition starting position varied.

(Other Respects)

This invention can be applied to both a system composed of plural pieces of equipment (for example, a host computer, interface devices, a reader, a printer, etc.) and a single apparatus (for example, a copier, a facsimile device, etc.).

This invention also includes in its category any apparatus that realizes the aforesaid function of the embodiments by both supplying a program code for realizing the functions of the embodiments to a computer (CPU and MPU) in an apparatus or a system connected to the various kinds of devices so that the functions of the above-mentioned embodiments are realized and the various kinds of devices are made to operate and making the various kinds of devices operate according to the program stored in the computer of the apparatus or the system.

Moreover, in this case, a program code itself of the software will realize the aforesaid function of the embodiment, and hence the program code itself and means for supplying the program code to the computer and, for example, a storage medium that has stored such program code constitute this invention.

As a storage medium for storing such program code, for example, a floppy disk, a hard disk, an optical disk, a magneto-optical disk, a CD-ROM, magnetic tape, a nonvolatile memory card, ROM, etc. can be used.

Needless to say, in addition to the case where the aforesaid function of the embodiment is realized by the computer executing a supplied program code, even in the case where the aforesaid function of the embodiment is realized by the program code that works together with an OS (operating system) or other application software currently operating in the computer, such program code is included in the embodiment of this invention.

Moreover, needless to say, also in the case where the supplied program code is stored in memory provided in a function extension board of the computer or in a function extension unit connected to the computer and subsequently a processor installed on the function extension board or the function extension unit performs a part of or all of actual processing based on instructions of the program code and the processing realizes the aforesaid function of the embodiment, that program code is included in this invention.

The present invention has been described in detail with respect to preferred embodiments, and it will now be apparent from the foregoing to those skilled in the art that changes and modifications may be made without departing from the invention in its broader aspect, and it is the intention, therefore, that the appended claims cover all such changes and modifications as fall within the true spirit of the invention.

What is claimed is:

1. A printing method for conducting printing on a printing medium using a printing head in which a plurality of printing elements are arranged in a column direction, the printing being performed by scanning the printing head in a raster direction, the method comprising:

an allocating step of using an A×B matrix created by combining a plurality of different M×N dot arrangements in both the raster and column directions as a minimum unit, the dot arrangements corresponding to the same level of input image data quantized into multivalued levels, and allocating the dot arrangements in the matrix to the input image data; and a printing step of forming dots on the printing medium on the basis of the dot arrangements of the matrix allocated to the input image data, wherein A kinds of dot arrangements are arranged for each raster corresponding to the input image data, a repetition sequence of the A kinds of dot arrangements in the raster direction is the same for every raster, and the dot arrangement corresponding to a starting position of the repetition sequence is different in every raster.

2. A printing method according to claim 1, wherein, in the matrix, the starting position of the repetition sequence of the A kinds of dot arrangements is shifted by a predetermined number for each raster.

3. A printing method according to claim 1, wherein the matrix is repeatedly used in the raster direction and in the column direction, and the dot arrangements in the matrix are allocated to the input image data.

4. A printing method according to claim 1, wherein the matrix is a matrix of 4×4 created by combining four dot arrangements in the raster direction and in the column direction, the dimensions of the dot arrangements are set to $\frac{1}{600}$ inch×$\frac{1}{600}$ inch, and the diameter of each dot formed on the printing medium is set to 30 $\mu$m.

5. A printing method according to claim 1, wherein the printing head is a head capable of ejecting ink and each printing element has an ejection opening for ejecting the ink.

6. A printing apparatus for conducting printing on a printing medium using a printing head in which a plurality of printing elements are arranged in a column direction, the printing being performed by scanning the printing head in a raster direction, the apparatus comprising:

allocating means for using an A×B matrix created by combining a plurality of different M×N dot arrangements in both the raster and column directions as a minimum unit, the dot arrangements corresponding to the same level of input image data quantized into multivalued levels, and allocating the dot arrangements in the matrix to the input image data; and printing control means for forming dots on the printing medium on the basis of the dot arrangements of the matrix allocated to the input image data, wherein A kinds of dot arrangement are arranged for each raster corresponding to the input image data, a repetition sequence of the A kinds of dot arrangements in the raster direction is the same for every raster, and the dot arrangement corresponding to a starting position of the repition sequence is different in every raster.

7. A program for conducting printing on a printing medium using a printing head in which a plurality of printing elements are arranged in a column direction, the printing being performed by scanning the printing head in a raster direction, the program allowing a computer to execute:

an allocating step of using an A×B matrix created by combining a plurality of different M×N dot arrangements in both the raster and column directions as a minimum unit, the dot arrangements corresponding to the same level of input image data quantized into multivalued levels, and allocating the dot arrangements in the matrix to the input image data; and a printing step of forming dots on the printing medium on the basis of the dot arrangements of the matrix allocated to the input image data, wherein A kinds of dot arrangements are arranged for each raster corresponding to the input image data, a repetition sequence of the A kinds of dot arrangements in the raster direction is the same for every raster, and the dot arrangement corresponding to a starting position of the repetition sequence is different in every raster.

8. A storage medium storing the program according to claim 7 and capable of being read by a computer.

* * * * *

UNITED STATES PATENT AND TRADEMARK OFFICE
CERTIFICATE OF CORRECTION

PATENT NO.       : 6,991,316 B2
APPLICATION NO.  : 10/649660
DATED            : January 31, 2006
INVENTOR(S)      : Maru et al.

It is certified that error appears in the above-identified patent and that said Letters Patent is hereby corrected as shown below:

COLUMN 21
Lines 34-37, delete "Claim 2".

Signed and Sealed this

Twenty-fifth Day of December, 2007

JON W. DUDAS
*Director of the United States Patent and Trademark Office*